(12) United States Patent
Ma

(10) Patent No.: US 12,371,259 B1
(45) Date of Patent: Jul. 29, 2025

(54) OBJECT HANDLING METHOD, OBJECT PICKING DEVICE AND HANDLING ROBOT

(71) Applicant: BEIJING GEEKPLUS TECHNOLOGY CO., LTD., Beijing (CN)

(72) Inventor: Qianli Ma, Beijing (CN)

(73) Assignee: BEIJING GEEKPLUS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 19/024,295

(22) Filed: Jan. 16, 2025

(30) Foreign Application Priority Data

Jan. 19, 2024 (CN) .......................... 202410080721.1

(51) Int. Cl.
*B65G 1/04* (2006.01)
(52) U.S. Cl.
CPC .................................. *B65G 1/0492* (2013.01)
(58) Field of Classification Search
CPC ...................................................... B65G 1/0492
See application file for complete search history.

(56) References Cited

U.S. PATENT DOCUMENTS

| | | | | |
|---|---|---|---|---|
| 4,415,975 A * | 11/1983 | Burt | ...................... | B65G 1/0421 700/214 |
| 6,923,612 B2 * | 8/2005 | Hansl | ................... | B65G 1/0435 414/280 |
| 10,683,171 B2 * | 6/2020 | Jarvis | .................. | G05D 1/0234 |
| 12,103,771 B2 * | 10/2024 | Cheng | ..................... | G06Q 10/08 |
| 2008/0082213 A1 * | 4/2008 | Ban | ......................... | B25J 9/1697 901/50 |
| 2008/0157970 A1 * | 7/2008 | Single | ................ | G08B 21/0244 340/572.1 |
| 2020/0191929 A1 * | 6/2020 | Kwiatkowski | .......... | G01S 17/89 |
| 2023/0050932 A1 * | 2/2023 | Mark | ................... | G05D 1/0291 |

(Continued)

FOREIGN PATENT DOCUMENTS

| | | |
|---|---|---|
| CN | 211920798 | 11/2020 |
| CN | 215364735 | 12/2021 |
| CN | 114367972 | 4/2022 |

(Continued)

OTHER PUBLICATIONS

CNIPA, Notification to Grant Patent Right for Invention for CN Application No. 202410080721.1, Jun. 25, 2024.

*Primary Examiner* — Kyle O Logan
(74) *Attorney, Agent, or Firm* — Hodgson Russ LLP

(57) ABSTRACT

An object handling method is provided, which is applied to an object picking device. The object picking device includes a base and a picking and placing mechanism. The picking and placing mechanism is extendable or retractable relative to the base. The picking and placing mechanism is configured to exert a force on a target object to carry the target object when picking up or returning the target object. The object handling method includes extending the picking and placing mechanism outward from the base at a first speed, acquiring a first extension distance of the picking and placing mechanism in a case that the first speed is greater than a preset speed threshold, and extending the picking and placing mechanism outward from the base at a second speed in a case that the first extension distance is greater than or equal to a first preset distance.

20 Claims, 6 Drawing Sheets

(56) References Cited

U.S. PATENT DOCUMENTS

2024/0025058 A1* 1/2024 Johnson ................ B25J 18/025

FOREIGN PATENT DOCUMENTS

| | | |
|---|---|---|
| CN | 114684516 | 7/2022 |
| CN | 115924800 | 4/2023 |
| CN | 117262559 | 12/2023 |
| CN | 117284679 | 12/2023 |
| CN | 117360997 | 1/2024 |
| WO | 2022143133 | 7/2022 |

* cited by examiner

OBJECT HANDLING METHOD, OBJECT PICKING DEVICE AND HANDLING ROBOT

CROSS-REFERENCE TO RELATED APPLICATION

This application claims priority to Chinese Patent Application No. 202410080721.1, filed Jan. 19, 2024, the entire disclosure of which is hereby incorporated herein by reference.

FIELD

The present disclosure relates to the technical field of warehousing and logistics, and more particularly to an object handling method, an object picking device and a handling robot.

BACKGROUND

A handling robot is an important device in warehousing. The handling robot is capable of automatically placing a target object, such as a cargo box, onto a target carrier, such as a shelf, to complete a loading process, such as a box returning process, and is also capable of picking up the target object from the target carrier to complete an unloading process, such as a box picking process and then carrying the target object to a designated position.

SUMMARY

According to a first aspect of embodiments of the present disclosure, an object handling method is provided, which is applied to an object picking device. The object picking device includes a base and a picking and placing mechanism. The picking and placing mechanism is extendable or retractable relative to the base. The picking and placing mechanism is configured to exert a force on a target object to carry the target object when picking up or returning the target object. The method includes acquiring a first distance between the picking and placing mechanism and a target position, extending the picking and placing mechanism outward from the base at a first speed, acquiring an extension distance of the picking and placing mechanism in a case that the first speed is greater than a preset speed threshold, determining a second distance between the picking and placing mechanism and the target position based on the first distance and the extension distance, extending the picking and placing mechanism outward from the base at a second speed in a case that the second distance is less than or equal to a second preset distance, extending the picking and placing mechanism toward a target cargo position at a speed greater than the second speed in a case that the picking and placing mechanism has reached the target position, and decelerating and extending the picking and placing mechanism toward the target cargo position until the picking and placing mechanism has reached the target cargo position in a case that the extension distance is greater than a preset distance.

According to a second aspect of embodiments of the present disclosure, an object picking device is provided. The object picking device includes a base, a picking and placing mechanism arranged on the base, and a control mechanism. The picking and placing mechanism is extendable or retractable relative to the base, and the picking and placing mechanism is configured to exert a force on a target object to carry the target object when picking up or returning the target object. The control mechanism is configured to acquire a first distance between the picking and placing mechanism and a target position, extend the picking and placing mechanism outward from the base at a first speed, acquire an extension distance of the picking and placing mechanism in a case that the first speed is greater than a preset speed threshold, determine a second distance between the picking and placing mechanism and the target position based on the first distance and the extension distance, extend the picking and placing mechanism outward from the base at a second speed in a case that the second distance is less than or equal to a second preset distance, extend the picking and placing mechanism outward from the base at the second speed in a case that the extension distance is greater than or equal to a first preset distance, extend the picking and placing mechanism toward a target cargo position at a speed greater than the second speed in a case that the picking and placing mechanism has reached the target position, and decelerate and extend the picking and placing mechanism toward the target cargo position until the picking and placing mechanism has reached the target cargo position in a case that the extension distance is greater than a preset distance. The second speed is less than or equal to the preset speed threshold.

According to a third aspect of embodiments of the present disclosure, a handling robot is provided. The handling robot includes a chassis, a gantry arranged on the chassis, and an object picking device provided in the second aspect of the embodiments of the present disclosure. The object picking device is arranged on the gantry and is able to raise up and lower down along with the gantry.

BRIEF DESCRIPTION OF THE DRAWINGS

The accompanying drawings described herein are intended to provide further understanding of the present disclosure and constitute a part of the present disclosure. Illustrative embodiments of the present disclosure and their descriptions serve to explain the present disclosure and do not constitute improper limitations on the present disclosure.

DETAILED DESCRIPTION

In order to enable those skilled in the art to better understand technical solutions in the present disclosure, the technical solutions in embodiments of the present disclosure will be described clearly and completely below in conjunction with the accompanying drawings in the embodiments of the present disclosure. Obviously, described embodiments are only a part of the embodiments of the present disclosure, not all of the embodiments. Based on the embodiments in the present disclosure, all other embodiments obtained by ordinary technicians in this field without creative work should fall within the scope of protection of the present disclosure.

At present, when the handling robot picks or returns the target object, a telescopic mechanism needs to extend outward from a base and pick the target object from a target cargo position, or move the target object to a target cargo position. However, in a process of extending the telescopic mechanism outward from the base, a collision may exist between the telescopic mechanism and the target object or the target carrier, resulting in instability of an object on the target carrier or causing damage to the target object.

In order to solve the above problem, the present disclosure provides an object handling method, an object picking device and a handling robot, which may reduce a collision with a target object or a target carrier, prevent instability caused by shaking of the target object on the target carrier, and effectively protect the target object.

Figure 1:
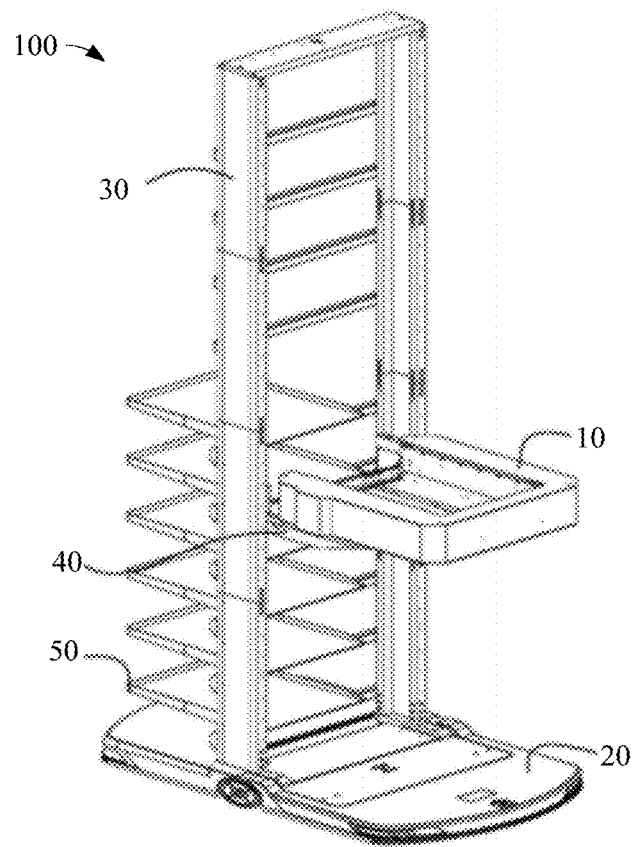
FIG. 1 is a schematic diagram illustrating a handling robot provided in an embodiment of the present disclosure.

FIG. 1 is a schematic diagram illustrating a handling robot provided in an embodiment of the present disclosure.

Referring to FIG. 1, in some examples of embodiments of the present disclosure, a handling robot 100 is provided, which may be applied in a warehousing system and walk on a floor, a countertop or a supporting surface of the warehousing system to carry a target object 300, such as a cargo box, a material box or a packaging box, from one position to another position in the warehousing system.

In some examples, the handling robot 100 may include a mobile chassis 20. The mobile chassis 20 may be provided with a walking wheel. The walking wheel is driven by a motor to rotate, thus enabling the mobile chassis 20 to walk on the floor, the countertop or the supporting surface.

In some examples, the handling robot 100 may include a gantry 30. The gantry 30 may be arranged on a base 11. For example, the gantry 30 is fixedly connected to the base 11, or is detachably connected to the base 11 by a connecting component such as a bolt and a screw. When the base 11 walks on the floor, the countertop or the supporting surface, the gantry 30 may be driven to move along with the base 11.

In some examples, the handling robot 100 may include an object picking device 10. The object picking device 10 may be arranged on the gantry 30 and is able to raise up and lower down along with the gantry 30, thus adjusting a height position of the object picking device 10 on the gantry 30, so as to pick up and return the target object 300 stored in target cargo positions at different heights.

In some examples, the handling robot 100 may include a rotating mechanism 40. The rotating mechanism 40 may be connected to the object picking device 10. When the rotating mechanism 40 rotates, the object picking device 10 may be driven to rotate relative to the gantry 30. For example, an import and export direction of the object picking device 10 for picking up and returning an object may be rotated from one side of the gantry 30 to the other side of the gantry 30.

In some examples, the handling robot 100 may include a temporary storage board 50. The temporary storage board 50 may be arranged on the gantry 30. When the import and export direction of the object picking device 10 faces the gantry 30, the import and export of the object picking device 10 may be opposite to the temporary storage board 50, so that target object 300 is placed on the temporary storage board 50, or the target object 300 on the temporary storage board 50 is taken out.

In some examples, referring to FIG. 1, a plurality of temporary storage boards 50 may be provided, and the plurality of temporary storage boards 50 may be arranged side by side in a vertical direction on the gantry 30. In this way, each temporary storage board 50 may be placed with the target object 300, so that a handling capacity of the handling robot 100 may be improved and a handling efficiency of the target object 300 may be improved.

Figure 2:
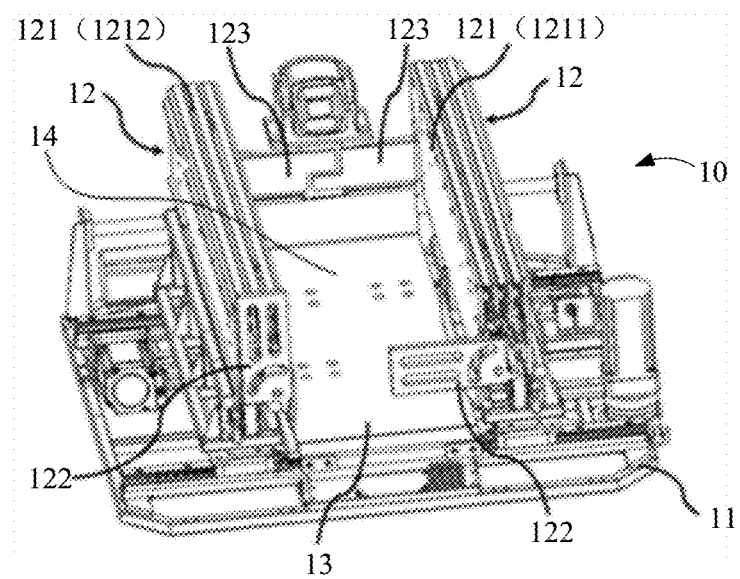
FIG. 2 is a schematic diagram illustrating an object picking device provided in an embodiment of the present disclosure.

FIG. 2 is a schematic diagram illustrating an object picking device provided in an embodiment of the present disclosure.

Referring to FIG. 2, in some examples of embodiments of the present disclosure, the object picking device 10 includes a base 11. In some examples, the base 11 may be arranged on the gantry 30 of the handling robot 100 and is able to raise up and lower down along with the gantry 30.

For example, in some examples, the base 11 may be arranged on the rotating mechanism 40, and the rotating mechanism 40 raises up and lowers down along with the gantry 30, thus driving the base 11 to raise up and lower down along with the gantry 30. In addition, the base 11 may be rotated relative to the gantry 30 under drive of the rotating mechanism 40, so that an opening direction of the base 11 faces different directions, so as to pick up and return the target object 300 located in different directions.

In some examples, a plurality of target carriers may be provided in the warehousing system, and the target object 300 is placed on the target carrier. A tunnel exists between two adjacent target carriers through which the handling robot 100 passes. The handling robot 100 may move into the tunnel via the walking wheels on the chassis 20. The object picking device 10 is lifted up and down along the gantry 30 to a height corresponding to a target cargo position. The rotating mechanism 40 drives the object picking device 10 to rotate, to make an opening of the object picking device 10 face the target cargo position. After the object picking device 10 picks up the target object 300 from the target cargo position, the object picking device 10 may be rotated under drive of the rotating mechanism 40, so that the opening of the object picking device 10 faces the temporary storage board 50, and the target object 300 is placed on the temporary storage board 50.

In some examples, the object picking device 10 may include a picking and placing mechanism 12, and the picking and placing mechanism 12 is extendable or retractable relative to the base 11. The picking and placing mechanism 12 is configured to exert a force on the target object 300 to carry the target object 300 when picking up or returning the target object 300.

In some examples, the picking and placing mechanism 12 may include a telescopic member 121. The telescopic member 121 is extendable or retractable relative to the base 11.

In some example, the telescopic member 121 may include a first telescopic member 1211, and the first telescopic member 1211 of the telescopic member 121 may be disposed at one side of the base 11.

In some example, the first telescopic member 1211 may include a plurality of stages of first telescopic plates, and two adjacent stages of first telescopic plates are slidably connected to each other.

In some example, that telescopic member 121 may include a second telescopic member 1212. The second telescopic member 1212 of the telescopic member 121 may be disposed at the other side of the base 11. The second telescopic member 1212 of the telescopic member 121 is opposite to the first telescopic member 1211 of the telescopic member 121. An accommodation space 14 exists between the second telescopic member 1212 of the telescopic member 121 and the first telescopic member 1211 of the telescopic member 121, and the accommodation space 14 is configured to accommodate the target object 300.

In some example, the second telescopic member 1212 of the telescopic member 121 may include a plurality of stages of second telescopic plates, and two adjacent stages of second telescopic plates are slidably connected to each other.

In some examples, the picking and placing mechanism 12 may include a scissor fork. The scissor fork is extendable or retractable relative to the base 11.

In some examples, the picking and placing mechanism 12 may include a force applying member. The force applying member may be arranged on the telescopic member 121. When the telescopic member 121 moves, the force applying member is drive to move relative to the base 11.

In some examples, the force applying member may include a front finger 122, and the front finger 122 may be disposed at a front end of the telescopic member 121. In some examples, the front end of the telescopic member 121 may be an end of the telescopic member 121 extending outward from the base 11. In some examples, when the telescopic member 121 is retracted to the base 11, the front end of the telescopic member 121 may be close to an opening of the base 11. When the telescopic member 121 extends outward from the base 11, the front end of the telescopic member 121 may be far away from the opening of the base 11 and located outside the base 11.

In some examples, the force applying member may include a rear finger 123, and the rear finger 123 may be disposed at a rear end of the telescopic member 121. In some examples, when the telescopic member 121 is retracted to the base 11, the rear end of the telescopic member 121 may be far away from the opening of the base 11 and located inside the base 11. When the telescopic member 121 extends outward from the base 11, the rear end of the telescopic member 121 may be close to the opening of the base 11 and located outside the base 11.

In some examples, the first telescopic member 1211 of the telescopic member 121 may be provided with the rear finger 123 and the front finger 122. The rear finger 123 and the front finger 122 are arranged at intervals along a telescopic direction of the first telescopic member 1211 of the telescopic member 121, and the accommodation space 14 may be provided between the rear finger 123 and the front finger 122.

In some examples, the second telescopic member 1212 of the telescopic member 121 may be provided with the rear finger 123 and the front finger 122. The rear finger 123 and the front finger 122 are arranged at intervals along a telescopic direction of the second telescopic member 1212 of the telescopic member 121. In some examples, the rear finger 123 on the second telescopic member 1212 of the telescopic member 121 is opposite to the rear finger 123 on the first telescopic member 1211 of the telescopic member 121. The front finger 122 on the second telescopic member 1212 of the telescopic member 121 is opposite to the front finger 122 on the first telescopic member 1211 of the telescopic member 121.

In some examples, in a process of extending the picking and placing mechanism 12 outward from the base 11, the rear finger 123 may exert a force on the target object 300 in the accommodation space 14 outward from the base 11, so as to push the target object 300 outward from the base 11 and move the target object 300 to a target cargo position, such as the temporary storage board 50 or a target cargo position on the target carrier.

In some examples, when the picking and placing mechanism 12 picks up an object and in a process that the picking and placing mechanism 12 retracts toward the base 11, the front finger 122 may exert a force on the target object 300 toward the base 11, to make the target object 300 move to the base 11.

In some examples, the force applying member may also be a suction cup, and the suction cup may be arranged at a front end of the telescopic member 121. For example, the suction cup may be arranged at a front end of the scissor fork, and may extend or retract relative to the base 11 under drive of the scissor fork.

In some examples, the object picking device 10 may include a follower tray 13, and the follower tray 13 may be movably arranged on the base 11. In some examples, the follower tray 13 may move along with the picking and placing mechanism 12. For example, in a process of extending the picking and placing mechanism 12 outward from the base 11, the follower tray 13, along with the picking and placing mechanism 12, extends outward from the base 11. In a process of retracting the picking and placing mechanism 12 toward the base 11, the follower tray 13, along with the picking and placing mechanism 12, retracts toward the base 11.

In some examples, the follower tray 13 may abut against a front end face of a target cargo position, to fill a gap between the base 11 and the front end face of the target cargo position.

Generally, the handling robot 100 moves in the tunnel between the two adjacent target carriers. In order to prevent a collision between a part of the handling robot 100 and a target carrier, causing a hazardous situation, a gap is reserved between the handling robot 100 and the target carrier. It is possible to prevent the collision between the part of the handling robot 100 and the target carrier, and it is also convenient for the object picking device 10 to rotate relative to the gantry 30 under drive of the rotating mechanism 40. In other words, a gap exists between the base 11 and the target carrier. Of course, in some examples, in order to facilitate rotation of the object picking device 10, a gap also exists between the base 11 and the temporary storage board 50. The front end face of the target cargo position may be an end face of a side of the target cargo position facing the picking and placing mechanism 12.

In some examples of the embodiments of the present disclosure, the follower tray 13 may be in contact with the picking and placing mechanism 12. In a process of extending the picking and placing mechanism 12 outward from the base 11, the follower tray 13 extends outward from the base 11 and abuts against the front end face of the target cargo position. For example, the follower tray 13 may abut against a front end crossbeam of the target carrier. Alternatively, in some examples, the follower tray 13 may abut against a front end face of the temporary storage board 50. In this way, the follower tray 13 fills the gap between the base 11 and the front end face of the target cargo position, and when the picking and placing mechanism 12 moves the target object 300 onto the follower tray 13, the follower tray 13 may support the target object 300, thus preventing the target object 300 from falling.

In some examples, after the follower tray 13 abuts against the front end face of the target cargo position, the picking and placing mechanism 12 may be separated from the follower tray 13 and continue to extend toward the target cargo position. In a process of retracting the picking and placing mechanism 12 toward the base 11, when the picking and placing mechanism 12 drives the target object 300 to move to the follower tray 13, the picking and placing mechanism 12 is in contact with the follower tray 13 and drives the follower tray 13 to retract toward the base 11.

In a process of extending the picking and placing mechanism 12 toward the target cargo position, the follower tray 13 extends outward from the base 11 and abuts against the front end face of the target cargo position. The follower tray 13 may collide the target cargo position, for example, a crossbeam of the target carrier or a crossbeam of the temporary storage board 50, thus causing the target carrier to shake, resulting in the target object 300 on the target carrier to shake and shift, affecting a success rate of picking and placing the target object 300 by the picking and placing mechanism 12.

In some examples, the picking and placing mechanism 12 may also collide the target object 300 on the base 11, which may cause damage to the target object 300.

Figure 3:
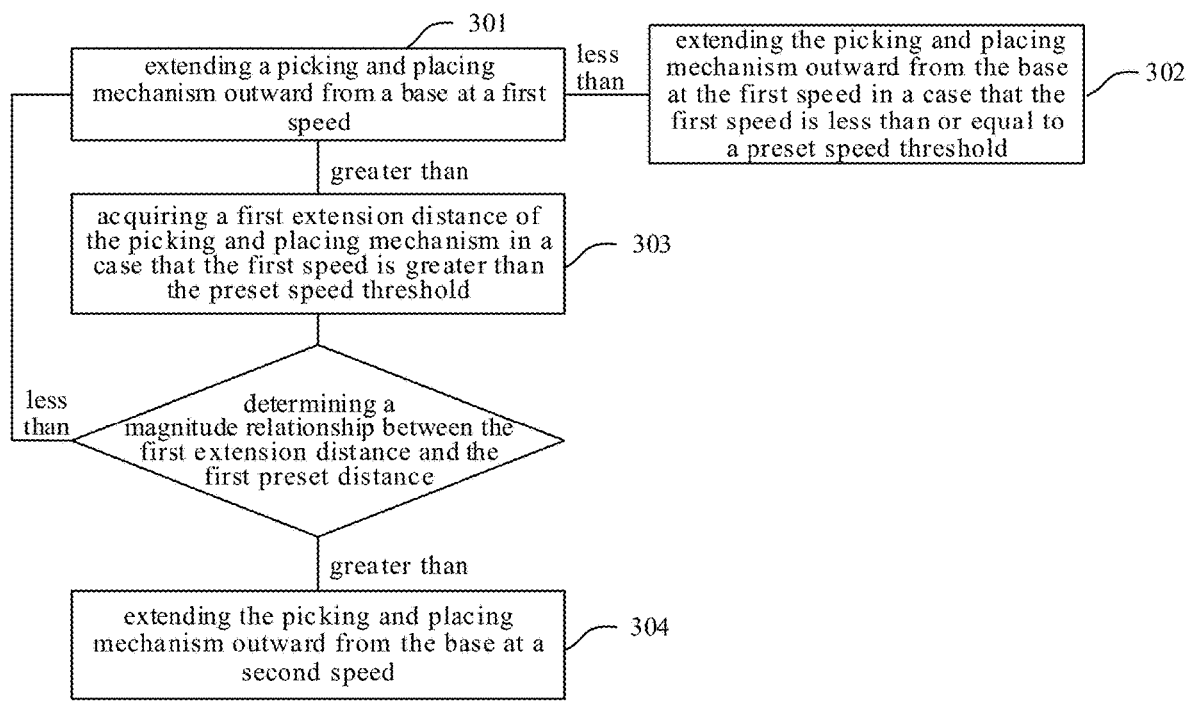
FIG. 3 is a flow chart showing an object handling method provided in an embodiment of the present disclosure.

FIG. 3 is a flow chart showing an object handling method provided in an embodiment of the present disclosure.

Referring to FIG. 3, in some examples of embodiments of the present disclosure, an object handling method is provided, which is applied to the object picking device 10 provided in the above-mentioned embodiments of the present disclosure. The object handling method includes following steps.

In step 301, a picking and placing mechanism 12 extends outward from a base 11 at a first speed.

In some examples of the embodiments of the present disclosure, a driving mechanism may be provided on the base 11, and a power output end of the driving mechanism is connected to the picking and placing mechanism 12, thus driving the picking and placing mechanism 12 to extend outward from the base 11. In some examples, after the driving mechanism is in stable operation, the picking and placing mechanism 12 may be driven to extend outward from the base 11 at the first speed.

In some examples of the embodiments of the present disclosure, in order to prevent the follower tray 13 colliding with the target carrier and causing the target object 300 on the target carrier to shake and shift, when the follower tray 13 is in contact with the target carrier, a moving speed of the follower tray 13 needs to be controlled within a speed threshold range. The speed threshold may be a preset speed threshold.

In some examples, the preset speed threshold may be any speed threshold between 10 mm/s to 30 mm/s.

In some examples, the preset speed threshold may be any speed threshold between 15 mm/s to 25 mm/s.

In some examples, the preset speed threshold may be any speed threshold between 18 mm/s to 22 mm/s.

In some examples, the preset speed threshold may be any speed threshold between 19.5 mm/s to 20.5 mm/s.

In some examples, the preset speed threshold may be set according to actual needs. Embodiments of the present disclosure are only shown as some examples and are not intended to limit a specific value of the preset speed threshold.

Numerical values and numerical ranges involved in the embodiments of the present disclosure are approximate values. Due to influence of a manufacturing process, there may be a certain range of errors, which may be considered negligible by those skilled in the art.

In order to prevent a situation that the first speed for moving the picking and placing mechanism 12 is too high, resulting in a speed at which the follower tray 13 moves and is in contact with a front end face of the target carrier being too high, causing a momentum of collision to be too high, and causing the target object 300 on the target carrier to shake, a magnitude of the first speed may be a system setting value, in some examples of the embodiments of the present disclosure.

In some examples, the first speed may be greater than the preset speed threshold.

In some examples, the first speed may also be less than or equal to the preset speed threshold.

In addition, in a process that the picking and placing mechanism 12 extends outward from the base 11 at the first speed, the rear finger 123 of the picking and placing mechanism 12 may collide with the target object 300 on the base 11. In order to prevent the rear finger 123 from causing damage the target object 300, in some examples of the embodiments of the present disclosure, it need to control a contact speed of the rear finger 123 when being in contact with the target object 300 within a preset speed threshold range.

In some examples, the contact speed of the rear finger 123 when being in contact with the target object 300 may be different from a contact speed of the follower tray 13 when being in contact with the target carrier in the above-mentioned embodiments of the present disclosure. In other words, a preset speed threshold of the follower tray 13 when being in contact with the target carrier may be a first preset speed threshold, and a preset speed threshold of the rear finger 123 when being in contact with the target object 300 may be a second preset speed threshold. The first preset speed threshold and the second preset speed threshold may be different.

Of course, in some examples, the first preset speed threshold and the second preset speed threshold may also be the same, which is not limited in the embodiments of the present disclosure.

In step 302, the picking and placing mechanism 12 extends outward from the base 11 at the first speed in a case that the first speed is less than or equal to the preset speed threshold.

In the case that the first speed is less than or equal to the preset speed threshold, a force of a collision between the follower tray 13 and the front end face of the target carrier is relatively small at this time, and the target object 300 on the target carrier may not be affected. Therefore, the picking and placing mechanism 12 may extend outward from the base 11 at a uniform speed at the first speed, so that the follower tray 13 is in contact with the front end face of the target carrier at the first speed.

Alternatively, a collision between the rear finger 123 of the picking and placing mechanism 12 and the target object 300 may not cause damage to the target object 300. Therefore, the picking and placing mechanism 12 may extend at the uniform speed at the first speed, to make the rear finger 123 contact target object 300 at the first speed.

In some examples, a picking and placing device may have determined that the first speed at which a given picking and placing mechanism 12 extends is less than or equal to the preset speed threshold.

In some examples, a relationship between a magnitude of the first speed and a magnitude of the speed threshold may be determined by comparing the magnitude of the first speed with the magnitude of the speed threshold.

That is to say, in some examples of the embodiments of the present disclosure, under drive of the driving mechanism, the picking and placing mechanism 12 may be accelerated to a relatively small first speed, for example, the first speed less than or equal to the preset speed threshold, and then extend outward from the base 11 at the uniform speed at the first speed. In this way, when the rear finger 123 is in contact with the target object 300, the collision between the rear finger 123 and the target object 300 may not cause damage to the target object 300, and the target object 300 may be effectively protected. In addition, when the follower tray 13, along with the picking and placing mechanism 12, extends outward from the base 11, the collision between the follower tray 13 and the target carrier is relatively small, and the target object 300 on the target carrier may not be shaken or shifted, which facilitates the picking and placing mechanism 12 to accurately pick up and place the target object 300, and improves a success rate of picking and placing the target object 300 by the picking and placing mechanism 12.

In step 303, a first extension distance L2 of the picking and placing mechanism 12 is acquired in a case that the first speed is greater than the preset speed threshold.

In some examples of the embodiments of the present disclosure, in the case that the first speed is greater than the preset speed threshold, if the picking and placing mechanism 12 moves at the uniform speed at the first speed, the collision between the rear finger 123 of the picking and placing mechanism 12 and the target object 300 or the collision between the follower tray 13 and the target carrier is relatively large. However, if a speed is reduced directly, part of energy of accelerating to the first speed may be wasted. In addition, a moving speed of the picking and placing mechanism 12 is slowed down, affecting an efficiency of the picking and placing mechanism 12 to pick up and place the target object 300.

At this time, a moving distance of the picking and placing mechanism 12 may be acquired, and a distance between the picking and placing mechanism 12 and the target carrier or the target object 300 is sufficient to decelerate the moving speed of the picking and placing mechanism 12 from the first speed to a preset speed threshold range.

That is to say, the object handling method provided in the embodiments of the present disclosure may include step as follows.

In step 304, the picking and placing mechanism 12 extends outward from the base 11 at a second speed in a case that the first extension distance L2 is greater than or equal to a first preset distance. The second speed is less than or equal to the preset speed threshold.

That is to say, in some examples of the embodiments of the present disclosure, under drive of the driving mechanism, the picking and placing mechanism 12 may be accelerated to a relatively large first speed, and the first speed is greater than the preset speed threshold. Then, the picking and placing mechanism 12 moves at the uniform speed at the first speed. In the case that the first extension distance L2 of the picking and placing mechanism 12 is greater than or equal to the first preset distance, the picking and placing mechanism 12 decelerates to the second speed and extends outward from the base 11, and the second speed is less than or equal to the preset speed threshold.

In some examples, in the case that the first extension distance L2 is greater than or equal to the first preset distance, a process of extending the picking and placing mechanism 12 outward from the base 11 may be a process of continuous deceleration. For example, when the picking and placing mechanism 12 decelerates until the rear finger 123 is in contact with the target object 300, an extension speed of the picking and placing mechanism 12 is the second speed. Alternatively, in some examples, the picking and placing mechanism 12 decelerates until the follower tray 13 is in contact with the target carrier, and an extension speed of the picking and placing mechanism 12 is the second speed.

In some examples, the second speed may be 0. That is, when the rear finger 123 is in contact with the target object 300, the picking and placing mechanism 12 stops extending. Alternatively, in some examples, when the follower tray 13 is in contact with the target carrier, the picking and placing mechanism 12 stops extending.

According to the object handling method provided in the embodiments of the present disclosure, the picking and placing mechanism 12 extends outward from the base 11 at the first speed, and the first extension distance L2 of the picking and placing mechanism 12 is acquired in the case that the first speed is greater than the preset speed threshold. In this way, it is convenient to determine the distance between the picking and placing mechanism 12 and the target object 300 or the target carrier in real time. The picking and placing mechanism 12 extends outward from the base 11 at the second speed in the case that the first extension distance L2 is greater than or equal to the first preset distance. The second speed is less than or equal to the preset speed threshold. In this way, in the process of extending the picking and placing mechanism 12 outward from the base 11, the picking and placing mechanism 12 may be in contact with the target object 300 or the target carrier at the relatively small second speed, so that a force of the collision between the picking and placing mechanism 12 and the target object 300 or the target carrier may be reduced, and the target object 300 may be effectively protected or the target object 300 on the target carrier may be prevented from being unstable due to shaking of the target carrier.

Figure 4:
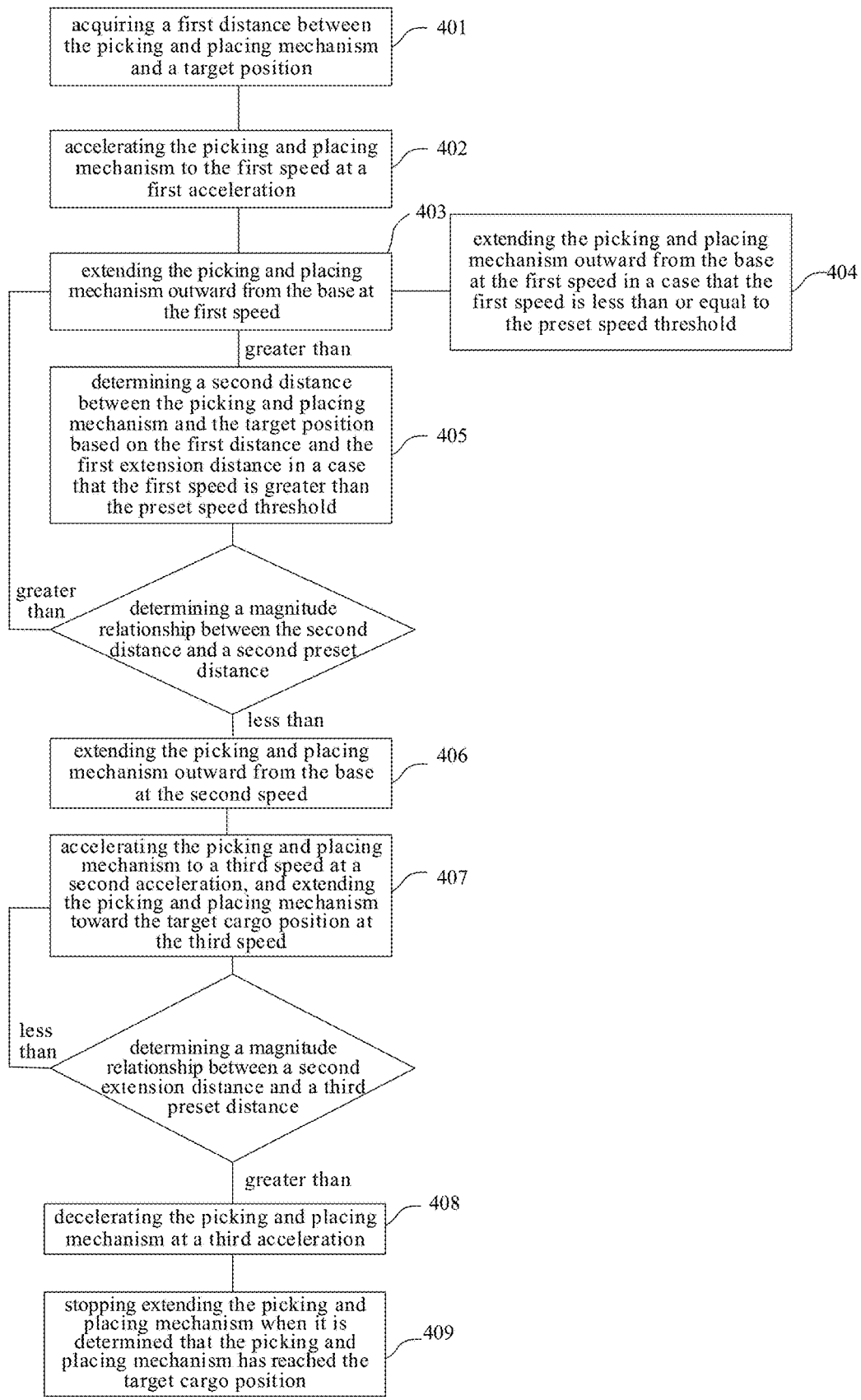
FIG. 4 is another flow chart showing an object handling method provided in an embodiment of the present disclosure.
Figure 5:
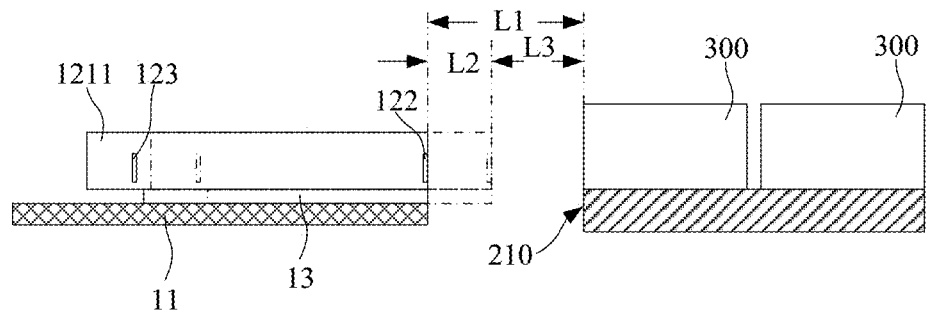
FIG. 5 is a schematic diagram illustrating an object picking process of an object picking device provided in an embodiment of the present disclosure.

FIG. 4 is another flow chart showing an object handling method provided in an embodiment of the present disclosure. FIG. 5 is a schematic diagram illustrating an object picking process of an object picking device provided in an embodiment of the present disclosure.

Referring to FIG. 4, in some examples of embodiments of the present disclosure, the object handling method may include following steps.

In step 401, a first distance between the picking and placing mechanism 12 and a target position is acquired.

Based on the detailed description of the above-mentioned embodiments of the present disclosure, the target position may include a first sub-target position 210. The first sub-target position 210 may be the front end face of the target cargo position. For example, in some examples, the first sub-target position 210 may be a front end face of a target carrier crossbeam.

In some examples, the first sub-target position 210 may be the front end face of the temporary storage board 50. That is, the first sub-target position 210 may be a collision point where the follower tray 13 may collide when the follower tray 13 extends outward from the base 11.

In some examples, the base 11 is arranged on the gantry 30. The follower tray 13 is arranged on the base 11. In addition, the temporary storage board 50 is also arranged on the gantry 30. The picking and placing mechanism 12 is arranged on the gantry 30. Therefore, a first sub-distance L1 between the picking and placing mechanism 12 and the temporary storage board 50 is usually a fixed value. The fixed value may be directly stored in a memory or a register of the object picking device 10 for retrieval and use.

In some examples, the follower tray 13 extends along with the picking and placing mechanism 12. Therefore, the first sub-distance L1 between the picking and placing mechanism 12 and the first sub-target position 210 may be the same as a distance between the follower tray 13 and the first sub-target position 210. Alternatively, the distance between the follower tray 13 and the first sub-target position 210 may be calculated by the first sub-distance L1 and a distance between a front end face of the follower tray 13 and a front end face of the picking and placing mechanism 12.

In some examples, the object picking device 10 may include a distance monitoring sensor. The distance monitoring sensor may be arranged at a front end of the picking and placing mechanism 12 and extend outward from the base 11 along with the picking and placing mechanism 12. In some examples, the distance monitoring sensor may be an ultrasonic radar, a millimeter wave radar or a laser radar, etc. In this way, a distance between the front end of the picking and placing mechanism 12 and the first sub-target position 210 may be monitored by the distance monitoring sensor. For example, when the handling robot 100 moves into the tunnel and moves to one side of the target cargo position, the first sub-distance L1 between the picking and placing mechanism 12 and the first sub-target position 210 is determined by a monitoring signal of the monitoring sensor, for example.

When the distance monitoring sensor is any one of the ultrasonic radar, the millimeter wave radar or the laser radar, the distance monitoring sensor may monitor the distance between the picking and placing mechanism 12 and the first sub-target position 210 in a process of extending the picking and placing mechanism 12 outward from the base 11.

In some examples, the distance monitoring sensor may be disposed on the base 11. That is, in the process of extending the picking and placing mechanism 12 outward from the base 11, the distance monitoring sensor remains stationary on the base 11. In some examples, the distance monitoring sensor may be a two-dimensional code camera.

In some examples, a two-dimensional code is provided on a crossbeam of the target carrier.

In some examples, after the handling robot 100 moves into the tunnel beside the target carrier, the object picking device 10 raises up and lowers down along with the gantry 30, and the two-dimensional code camera may scan and identify the two-dimensional code on the beam. After the two-dimensional code camera identifies a corresponding target two-dimensional code, the object picking device 10 stops at a height position corresponding to the target two-dimensional code on the gantry 30. At this time, the first sub-distance L1 exists between a front end of the base 11 of the object picking device 10 and the target carrier. A processor or a controller of the object picking device 10 may call the first sub-distance L1.

That is, in some examples, in a case that it is determined that the two-dimensional code camera scans a two-dimensional code corresponding to a target, the first sub-distance L1 between the picking and placing mechanism 12 and the first sub-target position 210 is determined.

In some examples of the embodiments of the present disclosure, the distance monitoring sensor is taken as the two-dimensional code camera as a specific example for illustration.

In some examples, the picking and placing mechanism 12 extends outward from the base 11, and the target object 300 may be moved from the target cargo position to the base 11, namely, an object picking process.

In some examples, the picking and placing mechanism 12 extends outward from the base 11, the target object 300 on the base 11 may be pushed out of the base 11 and moved to the target cargo position, namely, an object returning process.

For ease of explanation, in some embodiments of the present disclosure, the object picking process is first taken as an example for illustration.

In some examples, referring to FIG. 5, the picking and placing mechanism 12 is configured to extend outward from the base 11 to the target cargo position and move the target object 300 on the target cargo position onto the base 11.

In step 402, the picking and placing mechanism accelerates to the first speed at a first acceleration, to make the follower tray accelerate to the first speed at the first acceleration.

As described in detail in the above-mentioned embodiment of the present disclosure, the follower tray 13 is accelerated along with the picking and placing mechanism 12. In embodiment of the present disclosure, an acceleration of the follower tray 13 may be positively correlated with an acceleration of the picking and placing mechanism 12. For example, the acceleration of the follower tray 13 may be the same as the acceleration of the picking and placing mechanism 12. That is, in a process of accelerating the picking and placing mechanism 12, the follower tray 13 and the picking and placing mechanism 12 always maintain contact. In this way, the following tray 13 may be prevented from being separated from the picking and placing mechanism 12, and the following tray 13 may be prevented from colliding with the picking and placing mechanism 12 when the picking and placing mechanism 12 decelerates, so that the following tray 13 or the picking and placing mechanism 12 may be effectively protected.

In step 403, the picking and placing mechanism 12 extends outward from the base 11 at the first speed.

In step 404, the picking and placing mechanism 12 extends outward from the base 11 at the first speed in a case that the first speed is less than or equal to the preset speed threshold.

In an embodiment of the present disclosure, step 403 is the same as or similar to step 301 in the above-mentioned embodiment of the present disclosure, and step 404 is the same as or similar to step 302 in the above-mentioned embodiment of the present disclosure. For details, reference can be made to the detailed description in the above-mentioned embodiments of the present disclosure, which will not be elaborated herein.

In step 405, in a case that the first speed is greater than the preset speed threshold, a second distance L3 between the picking and placing mechanism 12 and the target position is determined based on the first distance and the first extension distance L2. In some examples, the target position may be the first sub-target position 210 and the first distance may be the first sub-distance L1.

As described in detail in the above-mentioned embodiment of the present disclosure, in some examples, in the case that the first speed is greater than the preset speed threshold, the picking and placing mechanism 12 may run at a uniform speed at the first speed for a certain distance and then decelerate. Alternatively, in some examples, the picking and placing mechanism 12 may continue to accelerate and then decelerate, as long as the distance between the picking and placing mechanism 12 and the first sub-target position 210 is sufficient to decelerate the picking and placing mechanism 12 to a second speed less than or equal to the preset speed threshold.

In some examples, as described in detail in the above-mentioned embodiments of the present disclosure, the picking and placing mechanism 12 may be driven by the driving mechanism to extend or retract relative to the base 11. The driving mechanism may include a drive motor.

In some examples, the drive motor may include a motor encoder configured to record a number of revolutions of a motor output shaft. Generally, a circumference of the motor output shaft is a determined length. Therefore, in some examples of the embodiments of the present disclosure, the first extension distance L2 may be determined according to the number of revolutions of the motor output shaft recorded by the motor encoder and the circumference of the motor output shaft.

In the process of extending the picking and placing mechanism 12 outward from the base 11, the second distance L3 between the picking and placing mechanism 12 and the first sub-target position 210 may be a difference between the first sub-distance L1 and the first extension distance L2.

In some examples, taking the first sub-target position 210 as an example, when the picking and placing mechanism 12 does not extend outward from the base 11, the motor encoder is at a zero position, and the distance between the front end of the picking and placing mechanism 12 and the first sub-target position 210 may be the first sub-distance L1. In the process of extending the picking and placing mechanism 12 outward from the base 11, the motor encoder records the number of revolutions of the motor output shaft, so as to calculate the first extension distance L2 of the picking and placing mechanism 12, and the difference between the first sub-distance L1 and the first extension distance L2 is the second distance L3 between the picking and placing mechanism 12 and the first sub-target position 210.

In some examples, the object picking device 10 includes a draw wire encoder. The draw wire encoder may be arranged on the base 11, and a draw wire of the draw wire encoder may be connected to the picking and placing mechanism 12.

In some examples, in the process of extending the picking and placing mechanism 12 outward from the base 11, the picking and placing mechanism 12 may drive the draw wire of the draw wire encoder to move together and extend outward from the base 11.

In some examples, in a process of retracting the picking and placing mechanism 12 toward the base 11, the draw wire of the draw wire encoder may be wound by the draw wire encoder.

In some examples of the embodiments of the present disclosure, the extension distance of the picking and placing mechanism 12 may also be determined by a length of a drawn wire of the draw wire encoder.

In some examples, when the picking and placing mechanism 12 is on the base 11 and does not extend outward from the base 11, the draw wire encoder is at a zero position, and the length of the drawn wire of the draw wire encoder may be 0. As the picking and placing mechanism 12 extends outward from the base 11, the picking and placing mechanism 12 pulls out the draw wire of the draw wire encoder, and the length of the drawn wire recorded by the draw wire encoder is the first extension distance L2 of the picking and placing mechanism 12. Then, the second distance L3 is determined according to the first sub-distance L1 and a first extension length.

In step 406, the picking and placing mechanism 12 extends outward from the base 11 at the second speed in a case that the second distance L3 is less than or equal to a second preset distance.

In some examples, in order to protect a motor, when the picking and placing mechanism 12 decelerates, it needs to limit the acceleration of the picking and placing mechanism 12 within a certain acceleration threshold range. That is, it needs to ensure that the second distance L3 is sufficient to decelerate a speed of the picking and placing mechanism 12 from the first speed to the second preset speed less than or equal to the preset speed threshold.

In some examples of the embodiments of the present disclosure, the second preset distance may be set according to an actual situation.

In some examples, the second preset distance may be determined according to the magnitude of the first speed, for example, the greater the first speed, the longer the second preset distance may be, and the smaller the first speed, the shorter the second preset distance may be.

In some examples, the second preset distance may also be a preset fixed distance. For example, a maximum value of the second preset distance may be determined based on the first speed to which the picking and placing mechanism 12 may accelerate to a maximum value. When the second distance L3 is less than or equal to the second preset distance, the picking and placing mechanism 12 decelerates and extends outward from the base 11 at the second speed.

In some examples, as the picking and placing mechanism 12 continues to extend outward from the base 11 at the second speed, the follower tray 13 extends along with the picking and placing mechanism 12, and abuts against the first sub-target position 210 at the second speed at the first sub-target position 210.

In some examples, the second speed may be a speed that changes in real time in a process of continuous deceleration of the picking and placing mechanism 12, and the second speed is less than or equal to the preset speed threshold.

In some examples, when the follower tray 13 moves to the first sub-target position 210, the second speed may be 0. That is, when the follower tray 13 abuts against the first sub-target position 210, the picking and placing mechanism 12 and the follower tray 13 may just stop.

In some examples, after the follower tray 13 is in contact with the first sub-target position 210, the picking and placing mechanism 12 may continue to extend outward from the base 11 and extend into a target cargo position, For example, the target cargo position may be a target cargo position on the target carrier or the temporary storage board 50.

In some examples, after the follower tray 13 is in contact with the first sub-target position 210, the object handling method may include following steps.

In step 407, the picking and placing mechanism 12 accelerates to a third speed at a second acceleration, and the picking and placing mechanism 12 extends toward the target cargo position at the third speed.

In some examples, after the follower tray 13 is in contact with the first sub-target position 210, in a process that the picking and placing mechanism 12 continues to extend, no collision occurs between the handling robot 100 and the target carrier. At this time, a moving speed of the picking and placing mechanism 12 may be increased, thus improving a working efficiency of the picking and placing mechanism 12.

In some examples, the third speed may be the same as the first speed in the above-mentioned embodiments of the present disclosure. In some examples, the third speed may also be different from the first speed. In an embodiment of the present disclosure, a magnitude of the third speed is not limited. The third speed may be any speed within an output power range of the drive motor.

In some examples, the second acceleration may be the same as the first acceleration in the above-mentioned embodiments of the present disclosure. In some examples, the second acceleration may also be different from the first acceleration in the above-mentioned embodiments of the present disclosure, which is not limited in the embodiment of the present disclosure.

In step 408, the picking and placing mechanism 12 decelerates at a third acceleration in a case that a second extension distance L4 is greater than or equal to a third preset distance.

In an embodiment of the present disclosure, a manner of determining the second extension distance L4 may be the same as or similar to a manner of determining the first extension distance L2 in the above-mentioned embodiment of the present disclosure, e.g., by the motor encoder of the drive motor, or by the draw wire encoder.

In step 409, the picking and placing mechanism 12 stops extending when it is determined that the picking and placing mechanism 12 has reached the target cargo position.

Figure 6:
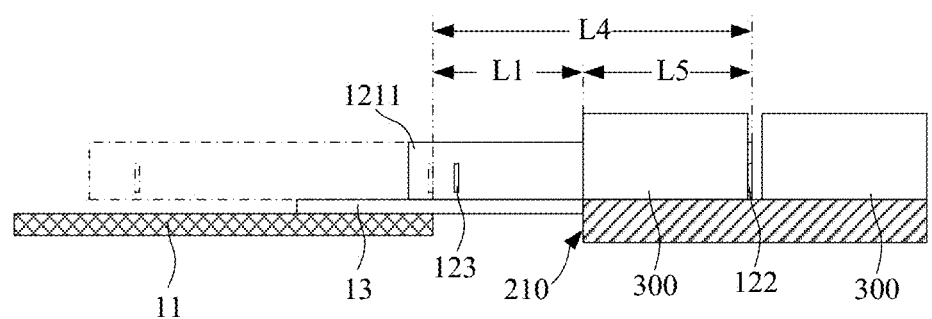
FIG. 6 is another schematic diagram illustrating an object picking process of an object picking device provided in an embodiment of the present disclosure.

FIG. 6 is another schematic diagram illustrating an object picking process of an object picking device provided in an embodiment of the present disclosure.

In some examples, referring to FIG. 6, when the target cargo position is an outer deep position of the target carrier, or when the target cargo position is the temporary storage board 50, it may be determined that the picking and placing mechanism 12 has reached the target cargo position in a case that the second extension distance L4 of the picking and placing mechanism 12 is equal to a sum of the first distance and a length L5 of the target object, thus stopping extending the picking and placing mechanism 12. In this way, the picking and placing mechanism 12 may be stopped from being extended in time, the picking and placing mechanism 12 may be prevented from being extended too far, and the rear finger 123 of the picking and placing mechanism 12 may be prevented to collide with the target object 300. The target object 300 may be effectively protected.

In some examples, it may be that when it is determined that the picking and placing mechanism 12 has reached the target cargo position, an extension speed of the picking and placing mechanism 12 may just decelerate to zero, thus stopping further extending.

In some examples, the picking and placing mechanism 12 decelerates at the third acceleration, and when the picking and placing mechanism 12 has reached the target cargo position, the picking and placing mechanism 12 may still have a certain speed for example, a small amount of displacement under inertia, not completely stopped. Generally, a distance between the rear finger 123 of the picking and placing mechanism 12 and the front end of the picking and placing mechanism 12 may be greater than the length L5 of the target object, so that there is a certain buffer margin between the rear finger 123 and the target object 300, which may effectively prevent the rear finger 123 from colliding the target object 300.

After the picking and placing mechanism 12 has reached the target cargo position, the front finger 122 of the picking and placing mechanism 12 may exert a force on the target object 300 toward the base 11, thus moving the target object 300 toward the base 11. For details, reference can be made to the detailed description in a related technology, which will not be elaborated herein.

Figure 7:
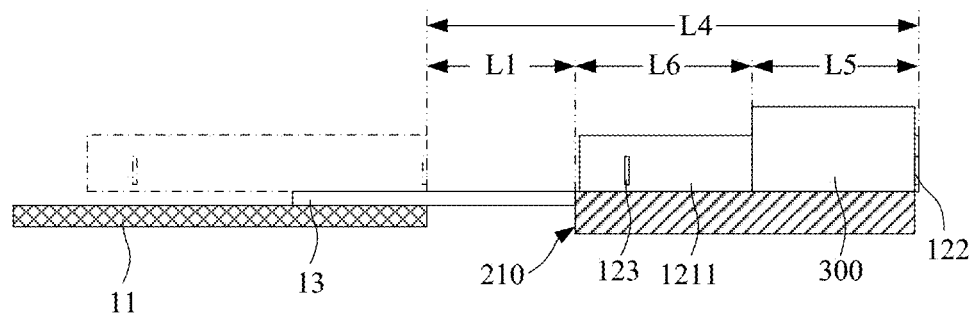
FIG. 7 is yet another schematic diagram illustrating an object picking process of an object picking device provided in an embodiment of the present disclosure.

FIG. 7 is yet another schematic diagram illustrating an object picking process of an object picking device provided in an embodiment of the present disclosure.

In some examples, referring to FIG. 7, the target cargo position may be an inner deep position. For example, when the target cargo position may be an inner deep position of the target carrier, it may be determined that the picking and placing mechanism 12 has reached the target cargo position in a case that the second extension distance L4 is equal to a sum of the first distance, a length L5 of the target object and a distance L6 between the front end face of the target object 300 and the first sub-target position 210. The front end face of the target object 300 is an end face of a side of the target object 300 facing the picking and placing mechanism 12.

In some examples, the object picking device 10 may include a position monitoring sensor. In some examples, the position monitoring sensor may be configured to monitor a relative position between the picking and placing mechanism 12 and the target object 300.

In some examples, it may be determined that the picking and placing mechanism 12 has reached the target cargo position via a trigger signal of the position monitoring sensor.

For example, in some examples, the position monitoring sensor may be an industrial camera or a vision sensor. In the process of extending the picking and placing mechanism 12, the industrial camera or the visual sensor takes a picture of the relative position between the picking and placing mechanism 12 and the target object 300. It is determined that the picking and placing mechanism 12 has reached a target position according to the picture taken by the industrial camera or the visual sensor. For example, the front finger 122 of the picking and placing mechanism 12 has reached a rear side of the target object 300, thus determining that the picking and placing mechanism 12 has reached the target position.

In some examples, the position monitoring sensor may be a through-beam sensor.

In some examples, the through-beam sensor may include a signal transmitting component. The signal transmitting component may transmit a signal outwardly. In some examples, a signal transmitted outwardly by the signal transmitting component may be an optical signal. In some examples, a signal transmitted outwardly by the signal transmitting component may be an electromagnetic signal. In some examples, a signal transmitted outwardly by the signal transmitting component may also be other types of signals, which is not limited in the embodiments of the present disclosure.

In some examples, the signal transmitting component may be arranged at a front end of one of the telescopic members 121.

In some examples, the through-beam sensor may include a signal receiving component. The signal receiving component may receive a signal transmitted by an external source. In some examples, the signal receiving component may receive the signal transmitted by the signal transmitting component.

In some examples, the signal receiving component may be arranged at a front end of another telescopic member 121.

In some examples, the signal receiving component may be opposite to the signal transmitting component.

In some examples, the signal receiving component may be directly opposite to the signal transmitting component.

In some examples, referring to FIG. 5, in the process of extending the picking and placing mechanism 12 outward from the base 11, when the first extension distance L2 of the picking and placing mechanism 12 is less than the first sub-distance L1, that is, when the front end of the picking and placing mechanism 12 has not reached the first sub-target position 210, the signal receiving component may receive the signal transmitted by the signal transmitting component.

In some examples, referring to FIG. 6 or FIG. 7, after the picking and placing mechanism 12 has reached the first sub-target position 210, in the process that the picking and placing mechanism 12 continues to extend outward from the base 11, the signal transmitted by the signal transmitting component may be blocked by the target object 300, resulting in the signal receiving component not receiving the signal transmitted by the signal transmitting component. At this time, it may be determined that the front end of the telescopic member 121 is located between the front end and a rear end of the target object 300, and the picking and placing mechanism 12 may decelerate at the third acceleration. In other words, at this time, the picking and placing mechanism 12 is about to reach the target goods, and the picking and placing mechanism 12 may move at a reduced speed.

In some examples, when the front end of the picking and placing mechanism 12 passes over the rear end of the target object 300, the signal sent by the signal transmitting component may be received by the signal receiving component again. At this time, the signal receiving component sends the trigger signal, thus determining that the picking and placing mechanism 12 has reached the target cargo position and stopping extending the picking and placing mechanism 12.

In the embodiment of the present disclosure, by providing the position monitoring sensor to monitor the position between the picking and placing mechanism 12 and the target object 300, it may be accurately determined whether the picking and placing mechanism 12 has reached the target cargo position, and a success rate of picking and placing the target object 300 by the picking and placing mechanism 12 may be improved.

For ease of explanation, in some embodiments of the present disclosure, an object returning process is taken as an example for illustration.

Figure 8:
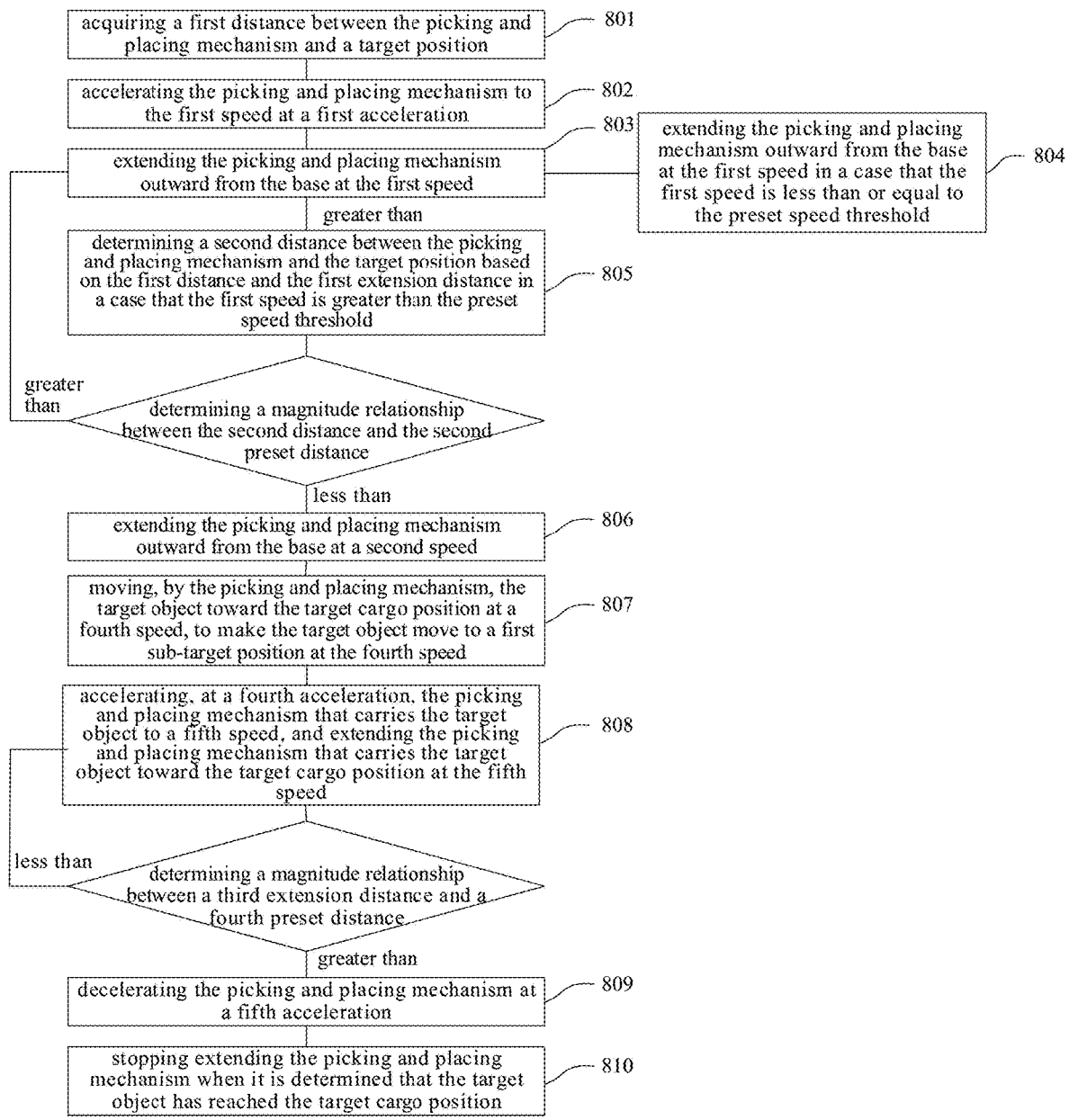
FIG. 8 is another flow chart showing an object handling method provided in an embodiment of the present disclosure.
Figure 9:
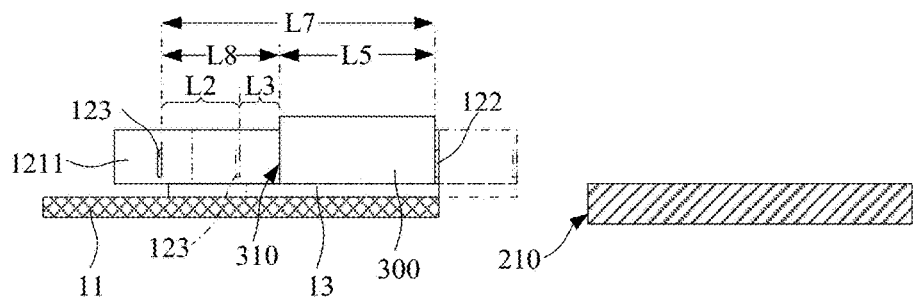
FIG. 9 is a schematic diagram illustrating an object returning process of an object picking device provided in an embodiment of the present disclosure.

FIG. 8 is another flow chart showing an object handling method provided in an embodiment of the present disclosure. FIG. 9 is a schematic diagram illustrating an object returning process of an object picking device provided in an embodiment of the present disclosure.

In some examples, the picking and placing mechanism 12 extends outward from the base 11 toward the target cargo position, and may be configured to move the target object 300 on the base 11 to a target cargo position, for example, a target cargo position on the target carrier, or the temporary storage board 50.

Referring to FIG. 8, in some examples of embodiments of the present disclosure, the object handling method may include following steps.

In step 801, a first distance between the picking and placing mechanism and a target position is acquired.

In some examples, referring to FIG. 9, the target position may include a second sub-target position.

In some examples, the second sub-target position may be a side of the target object 300 facing the rear finger 123. That is, when the target object 300 is on the base 11, a side of the target object 300 close to the rear finger 123 may be the second sub-target position.

Referring to FIG. 9, in a process that the picking and placing mechanism 12 moves the target object 300 onto the base 11, the front finger 122 of the picking and placing mechanism 12 continuously exerts a force on the target object 300. In some examples, the front finger 122 continuously contacts the target object 300, and thus a certain distance exists between the rear finger 123 and the target object 300. That is, in some examples, the first distance may be a second sub-distance L8 between the rear finger 123 and the second target position 310. In some examples, it may also be understood that the first distance is the second sub-distance L8 between the picking and placing mechanism 12 and the second sub-target position.

In some examples, a third distance L7 exists between the front finger 122 and the rear finger 123.

In some examples, the front finger 122 may be fixedly disposed at the front end of the telescopic member 121, and the rear finger 123 may be fixedly disposed at the rear end of the telescopic member 121. Therefore, the third distance L7 between the front finger 122 and the rear finger 123 may be a fixed distance. That is, the third distance L7 between the front finger 122 and the rear finger 123 may be a known distance.

In some examples, in order to accommodate to target objects 300 of different sizes, the third distance L7 between the front finger 122 and the rear finger 123 may also be a variable distance. For example, a position of the rear finger 123 at the rear end of the telescopic member 121 may be adjusted.

In some examples, the length L5 of the target object may be a known length. For example, in some examples, the target object 300 may be a target object 300 of a standard size. In some examples, the length L5 of the target object may be carried in order information when an upper computer issues the order information, and the handling robot acquires the length L5 of the target object by parsing the order information.

In some examples, the length L5 of the target object may be a length L5 of the target object determined based on the trigger signal of the position monitoring sensor in a process of moving the picking and placing mechanism 12 to the target cargo position.

Before the picking and placing mechanism 12 pushes the target object 300 from the base 11 to the outside of the base 11 and moves the target object 300 to the target cargo position, the picking and placing mechanism 12 may move the target object 300 onto the base 11. For example, the picking and placing mechanism 12 may take the target object 300 from one of target cargo positions of a target carrier, move the target object 300 to another target cargo position of another target carrier along with the handling robot 100, and place the target object 300 at the another target cargo position.

In some examples, the target object 300 may be determined in a process that the picking and placing mechanism 12 takes the target object 300 from the target cargo position.

In some examples, referring to the detailed description of the above-mentioned embodiment of the present disclosure, when the position monitoring sensor is an industrial camera or a vision sensor, the length L5 of the target object may be determined by determining a pixel point between a front end and a rear end of the target object 300 in an image taken by the position monitoring sensor.

In some examples, referring to the detailed description of the above-mentioned embodiment of the present disclosure, in the process of moving the picking and placing mechanism 12 to the target cargo position, an initial moment and an end moment at which the signal receiving component of the position monitoring sensor does not receive a signal may be acquired. The initial moment is a moment at which the transmitting signal of the signal transmitting component is just blocked by the target object 300. The end moment is a moment at which the transmitting signal of the signal transmitting component is just not blocked by the target object 300 again.

In some examples, after determining the initial moment and the end moment at which the signal receiving component does not receive the signal, the number of revolutions of the motor recorded by the motor encoder that drives the picking and placing mechanism 12 to extend between the initial moment and the end moment may be acquired. A telescopic distance of the picking and placing mechanism 12 between the initial moment and the end moment may be determined by the number of revolutions of the motor output shaft. At this time, the telescopic distance of the picking and placing mechanism 12 is the length L5 of the target object.

In some examples, after determining the initial moment and the end moment at which the signal receiving component does not receive the signal, the length L5 of the target object may also be determined according to the length of the drawn wire of the draw wire encoder between the initial moment and the end moment.

In some examples, the second sub-distance L8 may be determined based on the third distance L7 and the length L5 of the target object.

In some examples, the second sub-distance L8 may be a difference between the third distance L7 and the length L5 of the target object. That is, the second sub-distance L8 may be a distance that the rear finger 123 needs to move when the rear finger 123 moves to the second sub-target position to contact the target object 300.

In step 802, the picking and placing mechanism 12 accelerates to the first speed at a first acceleration.

In step 803, the picking and placing mechanism 12 extends outward from the base at the first speed.

In step 804, the picking and placing mechanism 12 extends outward from the base 11 at the first speed in a case that the first speed is less than or equal to the preset speed threshold.

In step 805, a second distance L3 between the picking and placing mechanism 12 and the target position is determined based on the first distance and the first extension distance L2 in a case that the first speed is greater than the preset speed threshold.

In some examples, the target position may be the second sub-target position, and the first distance may be the second sub-distance L8.

In step 806, the picking and placing mechanism 12 extends outward from the base 11 at a second speed in a case that the second distance L3 is less than or equal to the second preset distance.

In some embodiments of the present disclosure, steps 802 to 806 are the same as or similar to the process of extending the picking and placing mechanism 12 in steps 402 to 406 in the above-mentioned embodiment of the present disclosure. For details, reference can be made to the detailed description of steps 402 to 406 in the above-mentioned embodiment of the present disclosure, which will not be elaborated herein.

In some examples, when the rear finger 123 moves to the second sub-target position, the rear finger 123 is in contact with the target object 300 at the second speed. In some examples, the second speed may be 0.

Figure 10:
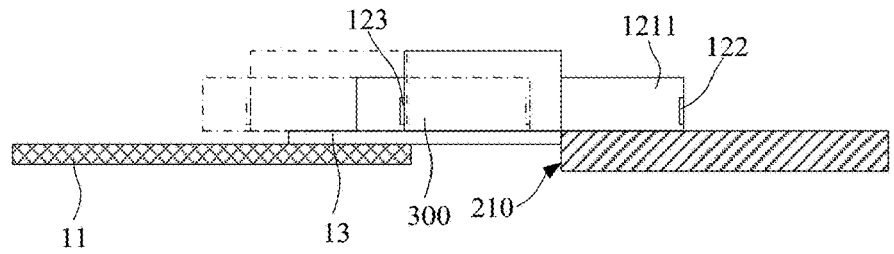
FIG. 10 is another schematic diagram illustrating an object returning process of an object picking device provided in an embodiment of the present disclosure.

FIG. 10 is another schematic diagram illustrating an object returning process of an object picking device provided in an embodiment of the present disclosure.

In some examples, referring to FIG. 10, after the rear finger 123 is in contact with the target object 300, as the picking and placing mechanism 12 continues to extend outward from the base 11, the rear finger 123 exerts a force on the target object 300 outward from the base 11 and pushes the target object 300 to move outward from the base 11.

In some examples, the object handling method includes a step as follows.

In step 807, the picking and placing mechanism 12 moves the target object 300 toward the target cargo position at a fourth speed, to make the target object 300 move to a first sub-target position 210 at the fourth speed.

In some examples, the fourth speed may be less than or equal to a preset speed threshold.

In some examples, after the rear finger 123 is in contact with the target object 300, the picking and placing mechanism 12 may extend outward from the base 11 at a uniform speed at the fourth speed. The fourth speed may be less than or equal to the preset speed threshold. In this way, the target object 300 may move to the first sub-target position 210 at a relatively small fourth speed, for example, a front end face of the target carrier or a front end face of the temporary storage board 50, which may reduce a collision between the target object 300 and the target carrier and may prevent shaking of the target object 300 on the target carrier.

In addition, the picking and placing mechanism 12 pushes the target object 300 outward from the base 11 at a uniform speed at the fourth speed. In this way, when the target object 300 moves to the first sub-target position 210, the picking and placing mechanism 12 and the target object 300 may maintain moving at the fourth speed. In this way, it may be prevented that when the target object 300 moves to the first sub-target position 210, a speed of the picking and placing mechanism 12 and the target object 300 is zero. A pushing force of the picking and placing mechanism 12 on the target object 300 only needs to overcome a sliding friction of the target object 300, and a situation of overcoming a static friction may be prevented. The drive motor that drives the picking and placing mechanism 12 to extend may be effectively protected.

In some examples, the fourth speed may be adjusted according to a weight of the target object 300. For example, the heavier the weight of the target object 300, the smaller the fourth speed may be. The lighter the target object 300, the greater the fourth speed may be. That is, the fourth speed may be inversely proportional to a mass of the target object 300. In this way, when the weight of the target object 300 becomes heavier, a driving speed of the target object 300 may be actively reduced, thus reducing an output power needed to be output by the drive motor, so that the output power of the motor is maintained within a rated power range, thus effectively protecting the drive motor.

In some examples, when a heavier target object 300 is moved, the fourth speed may be determined according to a rated output power of the motor. The fourth speed needs to be less than a moving speed when the target object 300 is pushed to move with the rated output power of the motor.

In some examples, the object picking device 10 may include a mass monitoring sensor. The mass of the target object 300 may be acquired according to a trigger signal of the mass monitoring sensor for weighing the mass of the target object 300.

In some examples, the mass monitoring sensor may be a pressure sensor. When the target object 300 is located on the base 11, the target object 300 exerts a force on the pressure sensor under action of gravity, so that the target object 300 triggers a signal.

In some examples, the mass of the target object 300 is different, and a maximum static friction force that needs to be overcome to move the target object 300 is different. That is, when the picking and placing mechanism 12 moves the target object 300, an input current of the motor is also different. In some examples, the mass of the target object 300 may be determined according to a current of the motor used by the picking and placing mechanism 12 for moving the target object 300. For example, in a process of the picking and placing mechanism 12 moving the target object 300 from the target cargo position of the target carrier to the base 11, the mass of the target object 300 may be determined according to a current of the motor used by the rear finger 123 for pulling the target object 300 to move.

Figure 11:
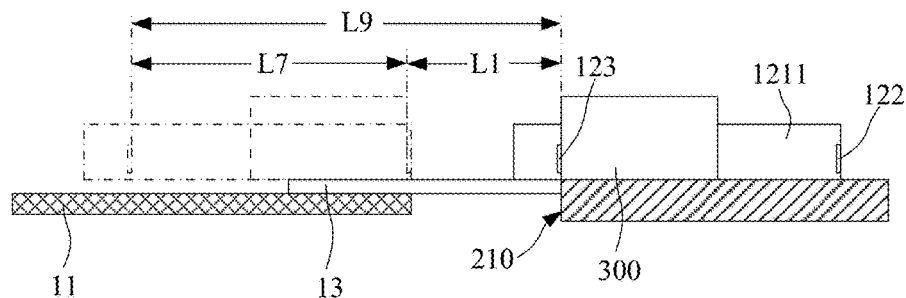
FIG. 11 is yet another schematic diagram illustrating an object returning process of an object picking device provided in an embodiment of the present disclosure.

FIG. 11 is yet another schematic diagram illustrating an object returning process of an object picking device provided in an embodiment of the present disclosure.

Referring to FIG. 10 and FIG. 11, in some examples, after the target object 300 moves to the first sub-target position 210, in a process that the picking and placing mechanism 12 continues to extend and push the target object 300 to move to the target cargo position, there is no collision. At this time, a moving speed of the picking and placing mechanism 12 may be increased, thus increasing a moving speed of the target object 300 and improving a moving efficiency of the target object 300.

Based on this, the object handling method may include following steps.

In step 808, the picking and placing mechanism 12 that carries the target object 300 accelerates to a fifth speed at a fourth acceleration, and the picking and placing mechanism 12 that carries the target object 300 extends toward the target cargo position at the fifth speed.

In some examples, step 808 may be the same as or similar to step 407 in the above-mentioned embodiment of the present disclosure. For details, reference can be made to the detailed description of step 407 in the above-mentioned embodiment of the present disclosure, which will not be elaborated herein.

In step 809, the picking and placing mechanism 12 decelerates at a fifth acceleration to decelerate the target object 300 in a case that a third extension distance L9 of the picking and placing mechanism 12 is greater than or equal to a fourth preset distance.

In some examples, in a case that the third extension distance L9 is greater than or equal to the fourth preset distance, the picking and placing mechanism 12 may decelerate at the fifth acceleration, so that the force exerted by the rear finger 123 on the target object 300 is reduced, and the target object 300 decelerates under action of a friction force.

In some examples, the fifth acceleration may be less than or equal to a sixth acceleration at which the target object 300 decelerates under action of a friction force, to make the force exerted by the rear finger 123 of the picking and placing mechanism on the target object 300 greater than or equal to zero in a process that the picking and placing mechanism decelerates at the fifth acceleration and extends outward from the base 11.

That is, in the process that the picking and placing mechanism 12 decelerates at the fifth acceleration, the rear finger 123 may be in contact with the target object 300 and still exert a certain force on the target object 300. In this way, the target object 300 may be prevented from being separated from the rear finger 123, making it difficult to determine a current position of the target object 300.

In step 810, the picking and placing mechanism 12 stops extending when it is determined that the target object 300 has reached the target cargo position.

In some examples, referring to FIG. 11, the target position may be an outer deep position.

In some examples, it is determined that the target object 300 has reached the target cargo position in a case that the third extension distance L9 of the picking and placing mechanism 12 is equal to a distance between a zero position of the rear finger 123 of the picking and placing mechanism 12 and the first sub-target position 210.

In some examples, referring to FIG. 11, the third distance L7 between the rear finger 123 and the front finger 122 is a known distance, and the first sub-distance L1 between a front end of the picking and placing mechanism, i.e., the front finger 122, and the first sub-target position 210 is also a known distance. Therefore, the distance between the zero position of the rear finger 123 and the first sub-target position 210 may be determined according to the third distance L7 and the first sub-distance L1.

Figure 12:
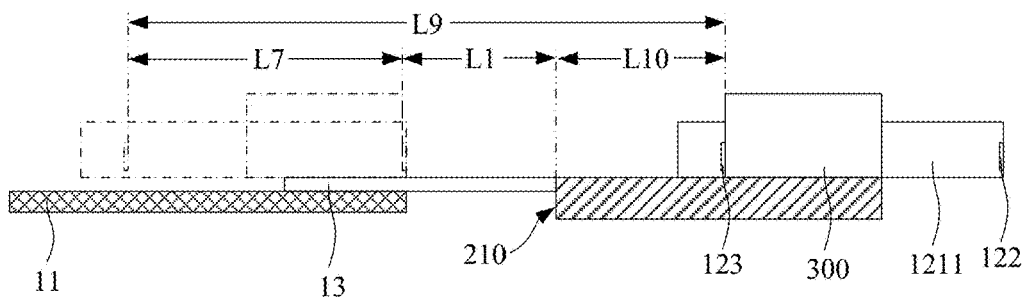
FIG. 12 is yet another schematic diagram illustrating an object returning process of an object picking device provided in an embodiment of the present disclosure.

FIG. 12 is yet another schematic diagram illustrating an object returning process of an object picking device provided in an embodiment of the present disclosure.

In some examples, referring to FIG. 12, the target position may be an inner deep position.

In some examples, it is determined that the picking and placing mechanism 12 has reached the target cargo position in a case that the third extension distance L9 of the picking and placing mechanism 12 is equal to a sum of a distance between a zero position of the rear finger 123 of the picking and placing mechanism 12 and the first sub-target position 210 and a distance L10 between a front end of the target cargo position and the first sub-target position 210. The front end of the target cargo position is an end face of a side of the target object 300 facing the picking and placing mechanism 12. In some examples, referring to FIG. 12, it may also be understood that it is determined that the picking and placing mechanism 12 has reached the target cargo position in a case that the third extension distance L9 of the picking and placing mechanism 12 is equal to a sum of the first sub-distance L1, the third distance L7 and the distance L10 between the front end of the target cargo position and the first sub-target position 210.

In some examples, the distance between the target cargo position and the first sub-target position 210 is a known distance. Therefore, it may be determined whether the target object 300 has reached the target cargo position according to the first sub-distance L1, the third distance L7 and the distance between the front end of the target cargo position and the first sub-target position 210.

According to the object handling method provided in the embodiments of the present disclosure, in the process of extending the picking and placing mechanism 12 outward from the base 11 at the first speed, the magnitude of the first speed is compared with the magnitude of the preset speed threshold. In the case that the first speed is greater than the preset speed threshold, the first extension distance L2 of the picking and placing mechanism 12 is acquired. In this way, it is convenient to determine the distance between the picking and placing mechanism 12 and the target object 300 or the target carrier in real time. In the case that the first extension distance L2 is greater than or equal to the first preset distance, the picking and placing mechanism 12 extends outward from the base 11 at the second speed. The second speed is less than or equal to the preset speed threshold. In this way, in the process of extending the picking and placing mechanism 12 outward from the base 11, the picking and placing mechanism 12 may be in contact with the target object 300 or the target carrier at the relatively small second speed, so that the force of the collision between the picking and placing mechanism 12 and the target object 300 or the target carrier may be reduced, and the target object 300 may be effectively protected or the target object on the target carrier may be prevented from being unstable due to the shaking of the target carrier.

Figure 13:
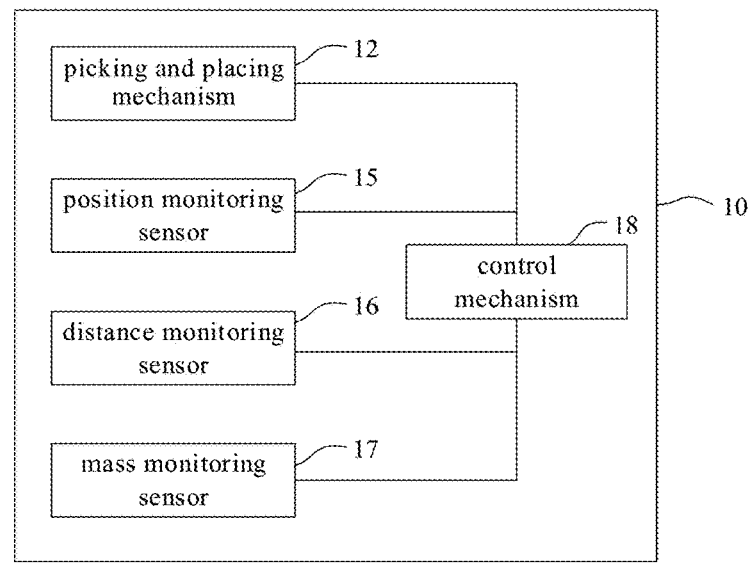
FIG. 13 is a block diagram of an object picking device provided in an embodiment of the present disclosure.

FIG. 13 is a block diagram of an object picking device provided in an embodiment of the present disclosure.

Based on the detailed description of the above-mentioned embodiments of the present disclosure, referring to FIG. 13, in some examples of the embodiments of the present disclosure, an object picking device 10 may include a control mechanism 18. The control mechanism 18 may be configured to extend a picking and placing mechanism 12 outward from a base 11 at a first speed, acquire a first extension distance L2 of the picking and placing mechanism 12 in a case that the first speed is greater than a preset speed threshold, and extend the picking and placing mechanism 12 outward from the base 11 at a second speed in a case that the first extension distance L2 is greater than or equal to a first preset distance. The second speed is less than or equal to the preset speed threshold.

In some examples, the control mechanism may be configured to extend the picking and placing mechanism 12 outward from the base 11 at the first speed in a case that the first speed is less than or equal to the preset speed threshold.

In some examples, before the picking and placing mechanism 12 extends outward from the base 11 at the first speed, the control mechanism 18 may be configured to acquire a first distance between the picking and placing mechanism 12 and a target position, determine a second distance L3 between the picking and placing mechanism 12 and the target position based on the first distance and the first extension distance L2, and extend the picking and placing mechanism 12 outward from the base 11 at the second speed in a case that the second distance L3 is less than or equal to a second preset distance.

In some examples, the control mechanism 18 may be configured to acquire a first sub-distance L1 between the picking and placing mechanism 12 and the first sub-target position 210.

In an implementation, the picking and placing mechanism 12 is configured to extend from the base 11 toward the target cargo position and move the target object 300 on the target cargo position to the base 11. Before the picking and placing mechanism 12 extends outward from the base 11 at the first speed, the control mechanism 18 is configured to accelerate the picking and placing mechanism 12 to the first speed at a first acceleration, to make a follower tray 13 accelerate to the first speed at the first acceleration.

In some examples, after the follower tray 13 abuts against the first sub-target position 210, the control mechanism 18 is configured to accelerate the picking and placing mechanism 12 to a third speed at a second acceleration and extend the picking and placing mechanism 12 toward the target cargo position at the third speed, decelerate the picking and placing mechanism 12 at a third acceleration in a case that a second extension distance L4 of the picking and placing mechanism 12 is greater than or equal to a third preset distance, and stop the extending the picking and placing mechanism 12 when it is determined that the picking and placing mechanism 12 has reached the target cargo position.

In some examples, the target cargo position is an outer deep position. The control mechanism 18 is configured to determine that the picking and placing mechanism 12 has reached the target cargo position in a case that the second extension distance L4 is equal to a sum of the first distance and a length of the target object 300.

In an implementation, the target cargo position is an inner deep position. The control mechanism 18 is configured to determine that the picking and placing mechanism 12 has reached the target cargo position in a case that the second extension distance L4 is equal to a sum of the first distance, a length L5 of the target object and a distance between the front end face of the target object 300 and the first sub-target position 210. The front end face of the target object 300 is an end face of a side of the target object 300 facing the picking and placing mechanism 12.

In some examples, the picking device 10 further includes a position monitoring sensor 15. The position monitoring sensor 15 is configured to monitor a relative position between the picking and placing mechanism 12 and the target object 300. The control mechanism 18 may be configured to determine that the picking and placing mechanism 12 has reached the target cargo position based on a trigger signal of the position monitoring sensor 15.

In some examples, the picking and placing mechanism 12 includes two telescopic members 121 arranged opposite to each other. The position monitoring sensor 15 is a through-beam sensor. The through-beam sensor includes a signal transmitting component arranged at a front end of one of the telescopic members 121, and a signal receiving component arranged at a front end of the other telescopic member 121. The signal receiving component is opposite to the signal transmitting component. The control mechanism 18 may be configured to determine that the telescopic members 121 are located on both sides of the target object 300, and the front ends of the telescopic members 121 are located between a front end and a rear end of the target object 300 in a case that the signal receiving component does not receive a transmitting signal of the signal transmitting component, and decelerate the picking and placing mechanism 12 at the third acceleration, and instruct the signal receiving component to send a trigger signal to determine that the picking and placing mechanism 12 has reached the target cargo position in a case that the signal receiving component has received the transmitting signal sent by the signal transmitting component.

In some examples, the picking and placing mechanism 12 is configured to extend from the base 11 toward a target cargo position and move the target object 300 on the base 11 to the target cargo position. The control mechanism 18 may be configured to extend the picking and placing mechanism 12 at a fourth speed to move the target object 300 toward the target cargo position, to make the follower tray 13 abut against the first sub-target position 210 at the fourth speed. The fourth speed is less than or equal to the preset speed threshold.

In some examples, before the follower tray 13 abuts against the first sub-target position 210 at the fourth speed, the control mechanism 18 may be configured to acquire a mass of the target object 300, and determine the fourth speed at which the picking and placing mechanism 12 moves the target object 300 based on the mass of the target object 300. The fourth speed is inversely proportional to the mass of the target object 300.

In some examples, the object picking device 10 further includes a mass monitoring sensor 17. The control mechanism 18 may be configured to determine the mass of the target object 300 based on a trigger signal of the mass monitoring sensor 17 and/or a current used by the picking and placing mechanism 12 for moving the target object 300.

In some examples, the picking and placing mechanism 12 has a rear finger 123 that exerts a force on the target object 300 outward from the base 11. The target position further includes a second sub-target position, and the second sub-target position is a side of the target object 300 facing the rear finger 123. The control mechanism 18 may be configured to acquire a second sub-distance L8 between the picking and placing mechanism 12 and the second sub-target position.

In some examples, the picking and placing mechanism 12 further has a front finger 122 that exerts a force on the target object 300 toward the base 11, and a third distance L7 exists between the front finger 122 and the rear finger 123. The control mechanism 18 may be configured to determine the second sub-distance L8 based on the third distance L7 and a length L5 of the target object.

In some examples, the control mechanism 18 may be configured to acquire the trigger signal of the position monitoring sensor 15 in a process of moving the picking and placing mechanism 12 to the target cargo position. The position monitoring sensor 15 is configured to monitor the relative position of the picking and placing mechanism 12 and the target object 300, and determine the length L5 of the target object based on the trigger signal of the position monitoring sensor 15.

In some examples, the control mechanism 18 may be configured to acquire an initial moment and an end moment at which the signal receiving component of the position monitoring sensor 15 does not receive a signal in a process of moving the picking and placing mechanism 12 to the target cargo position, acquire a number of revolutions of a drive motor of the picking and placing mechanism 12 between the initial moment and the end moment, and determine the length L5 of the target object based on the number of revolutions of the drive motor.

In some examples, the object picking device 10 further includes a draw wire encoder arranged on the base 11. A draw wire of the draw wire encoder is connected to the picking and placing mechanism 12 and moves along with the picking and placing mechanism 12 under drive of the picking and placing mechanism 12. The control mechanism 18 may be configured to acquire an initial moment and an end moment at which the signal receiving component of the position monitoring sensor 15 does not receive a signal in a process of moving the picking and placing mechanism 12 to the target cargo position, acquire a drawn length of the draw wire of the draw wire encoder along with the picking and placing mechanism 12 between the initial moment and the end moment, and determine the length L5 of the target object based on the drawn length of the draw wire of the draw wire encoder.

In some examples, after the follower tray 13 abuts against the first sub-target position 210, the control mechanism 18 may be configured to accelerate, at a fourth acceleration, the picking and placing mechanism 12 that carries the target object 300 to a fifth speed, and extend the picking and placing mechanism 12 that carries the target object 300 toward the target cargo position at the fifth speed, decelerate the picking and placing mechanism 12 at a fifth acceleration to decelerate the target object 300 in a case that a third extension distance L9 of the picking and placing mechanism 12 is greater than or equal to a fourth preset distance, and stop extending the picking and placing mechanism 12 when it is determined that the target object 300 has reached the target cargo position.

In some examples, the fifth acceleration is less than or equal to a sixth acceleration at which the target object 300 decelerates under action of a friction force, to make the force exerted by the rear finger 123 of the picking and placing mechanism on the target object 300 greater than or equal to zero in a process of the picking and placing mechanism decelerating at the fifth acceleration and extending outward from the base 11.

In some examples, the target cargo position is an outer deep position. The control mechanism 18 may be configured to determine that the target object 300 has reached the target cargo position in a case that the third extension distance L9 of the picking and placing mechanism 12 is equal to a distance L9 between a zero position of the rear finger 123 of the picking and placing mechanism 12 and the first sub-target position 210.

In some examples, the target cargo position is an inner deep position. The control mechanism 18 may be configured to determine that the picking and placing mechanism 12 has reached the target cargo position in a case that the third extension distance L9 of the picking and placing mechanism 12 is equal to a sum of a distance between a zero position of the rear finger 123 of the picking and placing mechanism 12 and the first sub-target position 210 and a distance L10 between a front end of the target cargo position and the first sub-target position 210. The front end of the target cargo position is an end face of a side of the target object 300 facing the picking and placing mechanism 12.

In some examples, the object picking device 10 further includes a distance monitoring sensor 16. The control mechanism 18 may be configured to determine the first sub-distance L1 between the picking and placing mechanism 12 and the first sub-target position 210 based on a trigger signal of the distance monitoring sensor 16.

In some examples of embodiments of the present disclosure, the object picking device 10 may include a processor or a memory. The memory may be configured to store one or more programs, and the one or more programs may be executed by the processor to implement the object handling method provided in the above-mentioned embodiments of the present disclosure.

In some examples, the memory may be one.
In some examples, there may be a plurality of memories.
In some examples, the processor may be one.
In some examples, there may be a plurality of processors.
In some examples, the program may include program code. The program code may be computer-executable instructions.

Illustratively, the processor may be a central processing unit (CPU), or an application specific integrated circuit (ASIC), or one or more integrated circuits configured to implement the embodiments of the present disclosure.

In some examples, the plurality of processors may be a same type of processors. For example, the plurality of processors are all CPUs.

In some examples, the plurality of processors may be different types of processors. For example, some of the plurality of processors are CPUs and the other processors are ASICs.

In some examples, the memory may be a high-speed RAM memory.

In some examples, the memory may be a non-volatile memory (NVM), such as at least one disk memory.

In some examples of embodiments of the present disclosure, there is provided a computer-readable storage medium having stored therein computer-executable instructions. When the computer-executable instructions are executed in the object picking device 10 provided in the above-mentioned embodiment of the present disclosure, the object picking device 10 may execute the object handling method provided in the above-mentioned embodiments of the present disclosure.

In some examples, the computer-readable storage medium may include a read-only memory (ROM), a random access memory (RAM), a compact disc read-only memory (CD-ROM), a magnetic tape, a floppy disk, an optical data storage device, etc.

The object picking and placing mechanism, the handling robot 100 and the computer-readable storage medium provided in the embodiments of the present disclosure have the same or corresponding technical features as the object handling method provided in the above-mentioned embodiments of the present disclosure, and may achieve the same or similar technical effects. For details, reference can be made to the detailed description of the above-mentioned embodiments of the present disclosure, which will not be elaborated herein.

In the present disclosure, relational terms such as first and second are used solely to distinguish one entity or operation from another entity or operation, it does not necessarily require or imply any such actual relationship or sequence between these entities or operations. The term "include", "comprise" or any other variation thereof is intended to cover a non-exclusive inclusion, so that a process, method, article or device that includes a series of elements does not only include those elements, but also includes other elements that are not explicitly listed, or also includes elements inherent in such a process, method, article or device. Without further restrictions, an element defined by the statement "including a . . . " does not exclude the existence of another identical element in the process, method, article or device that includes the element.

Various embodiments described herein are described in a related manner, reference being made to same or similar parts throughout the various embodiments, and each of the embodiments focuses on the differences from the other embodiments. In particular, for the device embodiments, since they are basically similar to the method embodiments, the description is relatively simple, and the relevant parts may be referred to the partial description of the method embodiments.

Logic and/or steps represented in a flowchart or otherwise described herein, for example, a sequential list of executable instructions that may be considered as being used to implement a logical function, may be embodied in any computer-readable medium for use by or in combination with an instruction execution system, apparatus or a device, such as a system based on a computer, a system including a processor or other systems that may fetch an instruction from an instruction execution system, apparatus or a device and execute the instruction.

For the purposes of this specification, the "computer-readable medium" may be any device that may contain, store, communicate, propagate or transmit a program for use by or in connection with an instruction execution system, apparatus or a device.

More specific examples (a non-exhaustive list) of computer-readable media include an electrical connection part (an electronic device) having one or more wires, a portable computer disk cartridge (a magnetic device), a random access memory (RAM), a read-only memory (ROM), an erasable and programmable read-only memory (EPROM or a flash memory), an optical fiber device, and a portable compact disk read-only memory (CD-ROM).

In addition, the computer-readable medium may even be a paper or other suitable medium on which the program may be printed, because the program may be acquired electronically by, for example, optically scanning the paper or other medium, followed by editing, interpreting or processing in other suitable ways as necessary, and then storing it in the computer memory. Various parts of the present disclosure may be implemented in hardware, software, firmware or a combination thereof.

In the above embodiments, a plurality of steps or methods may be implemented by software or firmware stored in a memory and executed by a suitable instruction execution system. For example, if they are implemented by hardware, as in another embodiment, they may be implemented by any one of following technologies known in the art or a combination thereof: a discrete logic circuit having a logic gate circuit for implementing a logic function on a data signal, an application specific integrated circuit having a suitable combinational of logic gate circuits, a programmable gate array (PGA), a field programmable gate array (FPGA), and the like.

Embodiments of the present disclosure provide an object handling method, an object picking device and a handling robot, which may reduce a collision with a target object or a target carrier, prevent instability caused by shaking of the target object on the target carrier, and effectively protect the target object.

According to a first aspect of embodiments of the present disclosure, an object handling method is provided, which is applied to an object picking device. The object picking device includes a base and a picking and placing mechanism. The picking and placing mechanism is extendable or retractable relative to the base. The picking and placing mechanism is configured to exert a force on a target object to carry the target object when picking up or returning the target object. The method includes extending the picking and placing mechanism outward from the base at a first speed, acquiring a first extension distance of the picking and placing mechanism in a case that the first speed is greater than a preset speed threshold, and extending the picking and placing mechanism outward from the base at a second speed in a case that the first extension distance is greater than or equal to a first preset distance. The second speed is less than or equal to the preset speed threshold.

In an implementation, the object handling method further includes extending the picking and placing mechanism outward from the base at the first speed in a case that the first speed is less than or equal to the preset speed threshold.

In an implementation, before the picking and placing mechanism extends outward from the base at the first speed, the object handling method further includes acquiring a first distance between the picking and placing mechanism and a target position. Extending the picking and placing mechanism outward from the base at the second speed in the case that the first extension distance is greater than or equal to the first preset distance includes determining a second distance between the picking and placing mechanism and the target position based on the first distance and the first extension distance, and extending the picking and placing mechanism outward from the base at the second speed in a case that the second distance is less than or equal to a second preset distance.

In an implementation, the object picking device further includes a follower tray arranged on the base. The follower tray, along with the picking and placing mechanism, extends or retracts relative to the base. The follower tray is configured to abut against a front end face of a target cargo position when the picking and placing mechanism extends outward from the base, to fill a gap between the base and the front end face of the target cargo position, and configured to support the target object when the target object moves onto the follower tray. The target position includes a first sub-target position, and the first sub-target position is the front end face of the target cargo position. An extension speed of the follower tray extending from the base is positively correlated with an extension speed of the picking and placing mechanism. Acquiring the first distance between the picking and placing mechanism and the target position includes acquiring a first sub-distance between the picking and placing mechanism and the first sub-target position.

In an implementation, the picking and placing mechanism is configured to extend from the base toward the target cargo position and move the target object on the target cargo position to the base. Before extending the picking and placing mechanism outward from the base at the first speed, the object handling method further includes accelerating the picking and placing mechanism to the first speed at a first acceleration, to make the follower tray accelerate to the first speed at the first acceleration.

In an implementation, after the follower tray abuts against the first sub-target position, the object handling method further includes accelerating the picking and placing mechanism to a third speed at a second acceleration and extending the picking and placing mechanism toward the target cargo position at the third speed, decelerating the picking and placing mechanism at a third acceleration in a case that a second extension distance is greater than or equal to a third preset distance, and stopping extending the picking and placing mechanism when it is determined that the picking and placing mechanism has reached the target cargo position.

In an implementation, the target cargo position is an outer deep position. Stopping extending the picking and placing mechanism when it is determined that the picking and placing mechanism has reached the target cargo position includes determining that the picking and placing mechanism has reached the target cargo position in a case that the second extension distance of the picking and placing mechanism is equal to a sum of the first distance and a length of the target object.

In an implementation, the target cargo position is an inner deep position. Stopping extending the picking and placing mechanism when it is determined that the picking and placing mechanism has reached the target cargo position includes determining that the picking and placing mechanism has reached the target cargo position in a case that the second extension distance is equal to a sum of the first distance, a length of the target object and a distance between the front end face of the target object and the first sub-target position. The front end face of the target object is an end face of a side of the target object facing the picking and placing mechanism.

In an implementation, the object picking device further includes a position monitoring sensor configured to monitor a relative position between the picking and placing mechanism and the target object. Stopping extending the picking and placing mechanism when it is determined that the picking and placing mechanism has reached the target cargo position includes determining that the picking and placing mechanism has reached the target cargo position based on a trigger signal of the position monitoring sensor.

In an implementation, the picking and placing mechanism includes two telescopic members arranged opposite to each other, and the position monitoring sensor is a through-beam sensor. The through-beam sensor includes a signal transmitting component arranged at a front end of a first telescopic member, and a signal receiving component arranged at a front end of a second telescopic member. The signal receiving component is opposite to the signal transmitting component. Before stopping extending the picking and placing mechanism when it is determined that the picking and placing mechanism has reached the target cargo position, the object handling method further includes determining that the telescopic members are located on both sides of the target object, and the front ends of the telescopic members are located between a front end and a rear end of the target object in a case that the signal receiving component does not receive a transmitting signal of the signal transmitting component, and decelerating the picking and placing mechanism at the third acceleration. Stopping extending the picking and placing mechanism when it is determined that the picking and placing mechanism has reached the target cargo position includes sending, by the signal receiving component, a trigger signal to determine that the picking and placing mechanism has reached the target cargo position in a case that the signal receiving component has received the transmitting signal sent by the signal transmitting component.

In an implementation, the picking and placing mechanism is configured to extend from the base toward a target cargo position and move the target object on the base to the target cargo position. The picking and placing mechanism has a rear finger that exerts a force on the target object outward from the base. The target position further includes a second sub-target position, and the second sub-target position is a side of the target object facing the rear finger. Acquiring the first distance between the picking and placing mechanism and the target position includes acquiring a second sub-distance between the picking and placing mechanism and the second sub-target position.

In an implementation, the picking and placing mechanism further has a front finger that exerts a force on the target object toward the base, and a third distance exists between the front finger and the rear finger. Acquiring the second sub-distance between the picking and placing mechanism and the second sub-target position includes determining the second sub-distance based on the third distance and a length of the target object.

In an implementation, after the rear finger abuts against the second sub-target position, the object handling method further includes moving, by the picking and placing mechanism, the target object toward the target cargo position at a fourth speed, to make the target object move to a first sub-target position at the fourth speed. The fourth speed is less than or equal to the preset speed threshold.

In an implementation, before moving, by the picking and placing mechanism, the target object toward the target cargo position at the fourth speed, to make the target object move to the first sub-target position at the fourth speed, the object handling method further includes acquiring a mass of the target object, and determining the fourth speed at which the picking and placing mechanism moves the target object based on the mass of the target object. The fourth speed is inversely proportional to the mass of the target object.

In an implementation, the object picking device further includes a mass monitoring sensor. Acquiring the mass of the target object includes determining the mass of the target object based on a trigger signal of the mass monitoring sensor and/or a current used by the picking and placing mechanism for moving the target object.

In an implementation, after the target object moves to the first sub-target position, the object handling method further includes accelerating, at a fourth acceleration, the picking and placing mechanism that carries the target object to a fifth speed and extending the picking and placing mechanism that carries the target object toward the target cargo position at the fifth speed, decelerating the picking and placing mechanism at a fifth acceleration to decelerate the target object in a case that a third extension distance of the picking and placing mechanism is greater than or equal to a fourth preset distance, and stopping extending the picking and placing mechanism when it is determined that the target object has reached the target cargo position.

In an implementation, the fifth acceleration is less than or equal to a sixth acceleration at which the target object decelerates under action of a friction force, to make the force exerted by the rear finger on the target object greater than or equal to zero in a process that the picking and placing mechanism decelerates at the fifth acceleration and extends outward from the base.

In an implementation, the target cargo position is an outer deep position. Stopping extending the picking and placing mechanism when it is determined that the target object has reached the target cargo position includes determining that the target object has reached the target cargo position in a case that the third extension distance is equal to a distance between a zero position of the rear finger of the picking and placing mechanism and the first sub-target position.

In an implementation, the target cargo position is an inner deep position. Stopping extending the picking and placing mechanism when it is determined that the target object has reached the target cargo position includes determining that the picking and placing mechanism has reached the target cargo position in a case that the third extension distance is equal to a sum of a distance between a zero position of the rear finger of the picking and placing mechanism and the first sub-target position and a distance between a front end of the target cargo position and the first sub-target position. The front end of the target cargo position is an end face of a side of the target cargo position facing the picking and placing mechanism.

In an implementation, the object picking device further includes a distance monitoring sensor. Acquiring the first sub-distance between the picking and placing mechanism and the first sub-target position includes determining the first sub-distance between the picking and placing mechanism and the first sub-target position based on a trigger signal of the distance monitoring sensor.

According to a second aspect of embodiments of the present disclosure, an object picking device is provided. The object picking device includes a base, a picking and placing mechanism arranged on the base, and a control mechanism. The picking and placing mechanism is extendable or retractable relative to the base, and the picking and placing mechanism is configured to exert a force on a target object to carry the target object when picking up or returning the target object. The control mechanism is configured to extend the picking and placing mechanism outward from the base at a first speed, acquire a first extension distance of the picking and placing mechanism in a case that the first speed is greater than a preset speed threshold, and extend the picking and placing mechanism outward from the base at a second speed in a case that the first extension distance is greater than or equal to a first preset distance. The second speed is less than or equal to the preset speed threshold.

In an implementation, the control mechanism is configured to extend the picking and placing mechanism outward from the base at the first speed in a case that the first speed is less than or equal to the preset speed threshold.

In an implementation, before the picking and placing mechanism extends outward from the base at the first speed, the control mechanism is configured to acquire a first distance between the picking and placing mechanism and a target position, determine a second distance between the picking and placing mechanism and the target position based on the first distance and the first extension distance, and extend the picking and placing mechanism outward from the base at the second speed in a case that the second distance is less than or equal to a second preset distance.

In an implementation, the object picking device includes a follower tray arranged on the base. The follower tray, along with the picking and placing mechanism, extends or retracts relative to the base. The follower tray is configured to abut against a front end face of a target cargo position when the picking and placing mechanism extends outward from the base, to fill a gap between the base and the front end face of the target cargo position, and configured to support the target object when the target object moves onto the follower tray. The target position includes a first sub-target position, and the first sub-target position is the front end face of the target cargo position. An extension speed of the follower tray extending from the base is positively correlated with an extension speed of the picking and placing mechanism. The control mechanism is configured to acquire a first sub-distance between the picking and placing mechanism and the first sub-target position.

In an implementation, the picking and placing mechanism is configured to extend from the base toward the target cargo position and move the target object on the target cargo position to the base. Before the picking and placing mechanism extends outward from the base at the first speed, the control mechanism is configured to accelerate the picking and placing mechanism to the first speed at a first acceleration, to make the follower tray accelerate to the first speed at the first acceleration.

In an implementation, after the follower tray abuts against the first sub-target position, the control mechanism is configured to accelerate the picking and placing mechanism to a third speed at a second acceleration and extend the picking and placing mechanism toward the target cargo position at the third speed, decelerate the picking and placing mechanism at a third acceleration in a case that a second extension distance of the picking and placing mechanism is greater than or equal to a third preset distance, and stop extending the picking and placing mechanism when it is determined that the picking and placing mechanism has reached the target cargo position.

In an implementation, the target cargo position is an outer deep position, and the control mechanism is configured to determine that the picking and placing mechanism has reached the target cargo position in a case that the second extension distance is equal to a sum of the first distance and a length of the target object.

In an implementation, the target cargo position is an inner deep position, and the control mechanism is configured to determine that the picking and placing mechanism has reached the target cargo position in a case that the second extension distance is equal to a sum of the first distance, a length of the target object and a distance between the front end face of the target object and the first sub-target position. The front end face of the target object is an end face of a side of the target object facing the picking and placing mechanism.

In an implementation, the object picking device further includes a position monitoring sensor configured to monitor a relative position between the picking and placing mechanism and the target object. The control mechanism is configured to determine that the picking and placing mechanism has reached the target cargo position based on a trigger signal of the position monitoring sensor.

In an implementation, the picking and placing mechanism includes two telescopic members arranged opposite to each other, and the position monitoring sensor is a through-beam sensor. The through-beam sensor includes a signal transmitting component arranged at a front end of a first telescopic member, and a signal receiving component arranged at a front end of a second telescopic member. The signal receiving component is opposite to the signal transmitting component. The control mechanism is configured to determine that the telescopic members are located on both sides of the target object, and the front ends of the telescopic members are located between a front end and a rear end of the target object in a case that the signal receiving component does not receive a transmitting signal of the signal transmitting component and decelerate the picking and placing mechanism at the third acceleration, and instruct the signal receiving component to send a trigger signal to determine that the picking and placing mechanism has reached the target cargo position in a case that the signal receiving component has received the transmitting signal sent by the signal transmitting component.

In an implementation, the picking and placing mechanism is configured to extend from the base toward a target cargo position and move the target object on the base to the target cargo position. The picking and placing mechanism has a rear finger that exerts a force on the target object outward from the base. The target position further includes a second sub-target position, and the second sub-target position is a side of the target object facing the rear finger. The control mechanism is configured to acquire a second sub-distance between the picking and placing mechanism and the second sub-target position.

In an implementation, the picking and placing mechanism further has a front finger that exerts a force on the target object toward the base, and a third distance exists between the front finger and the rear finger. The control mechanism is configured to determine the second sub-distance based on the third distance and a length of the target object.

In an implementation, after the rear finger abuts against the second sub-target position, the control mechanism is configured to extend the picking and placing mechanism at a fourth speed to move the target object toward the target cargo position, to make the target object move to a first sub-target position at the fourth speed. The fourth speed is less than or equal to the preset speed threshold.

In an implementation, before the target object moves to the first sub-target position at the fourth speed, the control mechanism is configured to acquire a mass of the target object, and determine the fourth speed at which the picking and placing mechanism moves the target object based on the mass of the target object. The fourth speed is inversely proportional to the mass of the target object.

In an implementation, the object picking device further includes a mass monitoring sensor. The control mechanism is configured to determine the mass of the target object based on a trigger signal of the mass monitoring sensor and/or a current used by the picking and placing mechanism for moving the target object.

In an implementation, after the target object moves to the first sub-target position, the control mechanism is configured to accelerate, at a fourth acceleration, the picking and placing mechanism that carries the target object to a fifth speed and extend the picking and placing mechanism that carries the target object toward the target cargo position at the fifth speed, decelerate the picking and placing mechanism at a fifth acceleration to decelerate the target object in a case that a third extension distance of the picking and placing mechanism is greater than or equal to a fourth preset distance, and stop extending the picking and placing mechanism when it is determined that the target object has reached the target cargo position.

In an implementation, the target cargo position is an outer deep position. The control mechanism is configured to determine that the target object has reached the target cargo position in a case that the third extension distance of the picking and placing mechanism is equal to a distance between a zero position of the rear finger of the picking and placing mechanism and the first sub-target position.

In an implementation, the target cargo position is an inner deep position. The control mechanism is configured to determine that the picking and placing mechanism has reached the target cargo position in a case that the third extension distance is equal to a sum of a distance between a zero position of the rear finger of the picking and placing mechanism and the first sub-target position and a distance between a front end of the target cargo position and the first sub-target position. The front end of the target cargo position is an end face of a side of the target cargo position facing the picking and placing mechanism.

In an implementation, the object picking device further includes a distance monitoring sensor. The control mechanism is further configured to determine the first sub-distance between the picking and placing mechanism and the first sub-target position based on a trigger signal of the distance monitoring sensor.

According to a third aspect of embodiments of the present disclosure, a handling robot is provided. The handling robot includes a chassis, a gantry arranged on the chassis, and an object picking device provided in any implementation of the second aspect of the embodiments of the present disclosure. The object picking device is arranged on the gantry and is able to raise up and lower down along with the gantry.

In an implementation, the handling robot further includes a temporary storage board arranged on the gantry, and a rotating mechanism connected to the object picking device, and configured to drive the object picking device to rotate, to make the object picking device deposit a target object on the temporary storage board, or to make the object picking device take out the target object from the temporary storage board.

According to the object handling method, the object picking device and the handling robot provided in the embodiments of the present disclosure, the picking and placing mechanism extends outward from the base at the first speed, and the first extension distance of the picking and placing mechanism is acquired in the case that the first speed is greater than the preset speed threshold. In this way, it is convenient to determine a distance between the picking and placing mechanism and the target object or target carrier in real time. The picking and placing mechanism extends outward from the base at the second speed in the case that the first extension distance is greater than or equal to the first preset distance. The second speed is less than or equal to the preset speed threshold. In this way, in a process of extending the picking and placing mechanism outward from the base, the picking and placing mechanism may be in contact with the target object or the target carrier at a relatively small second speed, so that a force of a collision between the picking and placing mechanism and the target object or the target carrier may be reduced, and the target object may be effectively protected or the target object on the target carrier may be prevented from being unstable due to shaking of the target carrier.

The above-mentioned embodiments of the present disclosure do not constitute a limitation on the protection scope of the present disclosure.

What is claimed is:

1. An object handling method, applied to an object picking device, the object picking device comprising: a base and a picking and placing mechanism, wherein the picking and placing mechanism is extendable or retractable relative to the base; the picking and placing mechanism is configured to exert a force on a target object to carry the target object when picking up or returning the target object; and the method comprises:
    acquiring a first distance between the picking and placing mechanism and a target position;
    extending the picking and placing mechanism outward from the base at a first speed;
    acquiring an extension distance of the picking and placing mechanism in a case that the first speed is greater than a preset speed threshold;
    determining a second distance between the picking and placing mechanism and the target position based on the first distance and the extension distance;
    extending the picking and placing mechanism outward from the base at a second speed in a case that the second distance is less than or equal to a second preset distance;
    extending the picking and placing mechanism toward a target cargo position at a speed greater than the second speed in a case that the picking and placing mechanism has reached the target position; and
    decelerating and extending the picking and placing mechanism toward the target cargo position until the picking and placing mechanism has reached the target cargo position in a case that the extension distance is greater than a preset distance.

2. The object handling method of claim 1, further comprising:
    extending the picking and placing mechanism outward from the base at the first speed in a case that the first speed is less than or equal to the preset speed threshold.

3. The object handling method of claim 1, wherein the object picking device further comprises: a follower tray arranged on the base, wherein the follower tray, along with the picking and placing mechanism, extends or retracts relative to the base; the follower tray is configured to abut against a front end face of the target cargo position when the picking and placing mechanism extends outward from the base, to fill a gap between the base and the front end face of the target cargo position, and configured to support the target object when the target object moves onto the follower tray; and the target position comprises a first sub-target position, and the first sub-target position is the front end face of the target cargo position; wherein an extension speed of the follower tray extending from the base is positively correlated with an extension speed of the picking and placing mechanism;
    wherein acquiring the first distance between the picking and placing mechanism and the target position comprises:
    acquiring a first sub-distance between the picking and placing mechanism and the first sub-target position.

4. The object handling method of claim 3, wherein the picking and placing mechanism is configured to extend from the base toward the target cargo position and move the target object on the target cargo position to the base;
    wherein before extending the picking and placing mechanism outward from the base at the first speed, the object handling method further comprises:
    accelerating, at a first acceleration, the picking and placing mechanism to the first speed, to make the follower tray accelerate, at the first acceleration, to the first speed.

5. The object handling method of claim 4, wherein the picking and placing mechanism having reached the target position comprises the follower tray abutting against the first sub-target position, and extending the picking and placing mechanism toward the target cargo position at the speed greater than the second speed in the case that the picking and placing mechanism has reached the target position comprises:
    accelerating, at a second acceleration, the picking and placing mechanism to a third speed, and extending the picking and placing mechanism toward the target cargo position at the third speed;
    wherein decelerating and extending the picking and placing mechanism toward the target cargo position until the picking and placing mechanism has reached the target cargo position in the case that the extension distance is greater than the preset distance comprises:
    decelerating the picking and placing mechanism at a third acceleration in a case that the extension distance is greater than or equal to a third preset distance; and
    stopping extending the picking and placing mechanism when it is determined that the picking and placing mechanism has reached the target cargo position.

6. The object handling method of claim 5, wherein the target cargo position is an outer deep position, and stopping extending the picking and placing mechanism when it is determined that the picking and placing mechanism has reached the target cargo position comprises:
    determining that the picking and placing mechanism has reached the target cargo position in a case that the extension distance is equal to a sum of the first distance and a length of the target object.

7. The object handling method of claim 5, wherein the target cargo position is an inner deep position, and stopping extending the picking and placing mechanism when it is determined that the picking and placing mechanism has reached the target cargo position comprises:
    determining that the picking and placing mechanism has reached the target cargo position in a case that the extension distance is equal to a sum of the first distance, a length of the target object and a distance between the front end face of the target object and the first sub-target position; wherein the front end face of the target object is an end face of a side of the target object facing the picking and placing mechanism.

8. The object handling method of claim 5, wherein the object picking device further comprises: a position monitoring sensor configured to monitor a relative position between the picking and placing mechanism and the target object;
wherein stopping extending the picking and placing mechanism when it is determined that the picking and placing mechanism has reached the target cargo position comprises:
determining that the picking and placing mechanism has reached the target cargo position based on a trigger signal of the position monitoring sensor.

9. The object handling method of claim 8, wherein the picking and placing mechanism comprises: two telescopic members arranged opposite to each other, and the position monitoring sensor is a through-beam sensor; and the through-beam sensor comprises:
a signal transmitting component arranged at a front end of a first telescopic member; and
a signal receiving component arranged at a front end of a second telescopic member, and the signal receiving component being opposite to the signal transmitting component;
wherein before stopping extending the picking and placing mechanism when it is determined that the picking and placing mechanism has reached the target cargo position, the object handling method further comprises:
determining that the two telescopic members are located on both sides of the target object, and the front end of each telescopic member is located between a front end and a rear end of the target object in a case that the signal receiving component does not receive a transmitting signal of the signal transmitting component; and decelerating the picking and placing mechanism at the third acceleration;
wherein stopping extending the picking and placing mechanism when it is determined that the picking and placing mechanism has reached the target cargo position comprises:
sending, by the signal receiving component, a trigger signal to determine that the picking and placing mechanism has reached the target cargo position in a case that the signal receiving component has received the transmitting signal sent by the signal transmitting component.

10. The object handling method of claim 3, wherein the object picking device further comprises: a distance monitoring sensor; and acquiring the first sub-distance between the picking and placing mechanism and the first sub-target position comprises:
determining the first sub-distance between the picking and placing mechanism and the first sub-target position based on a trigger signal of the distance monitoring sensor.

11. The object handling method of claim 1, wherein the picking and placing mechanism is configured to extend from the base toward the target cargo position and move the target object on the base to the target cargo position; the picking and placing mechanism has a rear finger that exerts a force on the target object outward from the base; and the target position further comprises a second sub-target position, and the second sub-target position is a side of the target object facing the rear finger;
wherein acquiring the first distance between the picking and placing mechanism and the target position comprises:
acquiring a second sub-distance between the picking and placing mechanism and the second sub-target position.

12. The object handling method of claim 11, wherein the picking and placing mechanism further has a front finger that exerts a force on the target object toward the base, and a third distance exists between the front finger and the rear finger;
wherein acquiring the second sub-distance between the picking and placing mechanism and the second sub-target position comprises:
determining the second sub-distance based on the third distance and a length of the target object.

13. The object handling method of claim 11, wherein the picking and placing mechanism having reached the target position comprises the rear finger abutting against the second sub-target position, and extending the picking and placing mechanism toward the target cargo position at the speed greater than the second speed in the case that the picking and placing mechanism has reached the target position comprises:
moving, by the picking and placing mechanism, the target object toward the target cargo position at a fourth speed, to make the target object move to a first sub-target position at the fourth speed; wherein the fourth speed is less than or equal to the preset speed threshold.

14. The object handling method of claim 13, wherein before moving, by the picking and placing mechanism, the target object toward the target cargo position at the fourth speed, to make the target object move to the first sub-target position at the fourth speed, the object handling method further comprises:
acquiring a mass of the target object; and
determining the fourth speed at which the picking and placing mechanism moves the target object based on the mass of the target object; wherein the fourth speed is inversely proportional to the mass of the target object.

15. The object handling method of claim 14, wherein the object picking device further comprises: a mass monitoring sensor; and acquiring the mass of the target object comprises:
determining the mass of the target object based on a trigger signal of the mass monitoring sensor and/or a current used by the picking and placing mechanism for moving the target object.

16. The object handling method of claim 13, wherein after the target object moves to the first sub-target position, the object handling method further comprises:
accelerating, at a fourth acceleration, the picking and placing mechanism that carries the target object to a fifth speed, and extending the picking and placing mechanism that carries the target object toward the target cargo position at the fifth speed;
decelerating the picking and placing mechanism at a fifth acceleration to decelerate the target object in a case that the extension distance is greater than or equal to a fourth preset distance; and
stopping extending the picking and placing mechanism when it is determined that the target object has reached the target cargo position.

17. The object handling method of claim 16, wherein the target cargo position is an outer deep position, and stopping extending the picking and placing mechanism when it is determined that the target object has reached the target cargo position comprises:
    determining that the target object has reached the target cargo position in a case that the extension distance is equal to a distance between a zero position of the rear finger of the picking and placing mechanism and the first sub-target position.

18. The object handling method of claim 16, wherein the target cargo position is an inner deep position, and stopping extending the picking and placing mechanism when it is determined that the target object has reached the target cargo position comprises:
    determining that the picking and placing mechanism has reached the target cargo position in a case that the extension distance is equal to a sum of a distance between a zero position of the rear finger of the picking and placing mechanism and the first sub-target position and a distance between a front end of the target cargo position and the first sub-target position; wherein the front end of the target cargo position is an end face of a side of the target cargo position facing the picking and placing mechanism.

19. An object picking device, comprising:
a base;
a picking and placing mechanism arranged on the base, wherein the picking and placing mechanism is extendable or retractable relative to the base, and the picking and placing mechanism is configured to exert a force on a target object to carry the target object when picking up or returning the target object; and
a control mechanism configured to:
acquire a first distance between the picking and placing mechanism and a target position;
extend the picking and placing mechanism outward from the base at a first speed;
acquire an extension distance of the picking and placing mechanism in a case that the first speed is greater than a preset speed threshold;
determine a second distance between the picking and placing mechanism and the target position based on the first distance and the extension distance;
extend the picking and placing mechanism outward from the base at a second speed in a case that the second distance is less than or equal to a second preset distance;
extend the picking and placing mechanism outward from the base at the second speed in a case that the extension distance is greater than or equal to a first preset distance;
wherein the second speed is less than or equal to the preset speed threshold;
extend the picking and placing mechanism toward a target cargo position at a speed greater than the second speed in a case that the picking and placing mechanism has reached the target position; and
decelerate and extend the picking and placing mechanism toward the target cargo position until the picking and placing mechanism has reached the target cargo position in a case that the extension distance is greater than a preset distance.

20. A handling robot, comprising:
a chassis;
a gantry arranged on the chassis; and
an object picking device arranged on the gantry and is able to raise up and lower down along with the gantry;
wherein the object picking device comprises:
a base;
a picking and placing mechanism arranged on the base, wherein the picking and placing mechanism is extendable or retractable relative to the base, and the picking and placing mechanism is configured to exert a force on a target object to carry the target object when picking up or returning the target object; and
a control mechanism configured to:
acquire a first distance between the picking and placing mechanism and a target position;
extend the picking and placing mechanism outward from the base at a first speed;
acquire an extension distance of the picking and placing mechanism in a case that the first speed is greater than a preset speed threshold;
determine a second distance between the picking and placing mechanism and the target position based on the first distance and the extension distance;
extend the picking and placing mechanism outward from the base at a second speed in a case that the second distance is less than or equal to a second preset distance;
extend the picking and placing mechanism outward from the base at the second speed in a case that the extension distance is greater than or equal to a first preset distance;
wherein the second speed is less than or equal to the preset speed threshold;
extend the picking and placing mechanism toward a target cargo position at a speed greater than the second speed in a case that the picking and placing mechanism has reached the target position; and
decelerate and extend the picking and placing mechanism toward the target cargo position until the picking and placing mechanism has reached the target cargo position in a case that the extension distance is greater than a preset distance.

* * * * *